(12) United States Patent
Horie

(10) Patent No.: US 7,869,200 B2
(45) Date of Patent: Jan. 11, 2011

(54) ELECTRONIC DEVICE AND KEYBOARD MECHANISM

(75) Inventor: Takefumi Horie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/585,655

(22) Filed: Sep. 21, 2009

(65) Prior Publication Data

US 2010/0014230 A1 Jan. 21, 2010

Related U.S. Application Data

(63) Continuation of application No. PCT/JP2007/056451, filed on Mar. 27, 2007.

(51) Int. Cl.
*H05K 5/00* (2006.01)
*H05K 7/00* (2006.01)

(52) U.S. Cl. ............................. 361/679.02; 361/679.17; 361/679.58

(58) Field of Classification Search ............ 361/679.02, 361/679.17, 679.58
See application file for complete search history.

(56) References Cited

U.S. PATENT DOCUMENTS

| 6,262,885 | B1 * | 7/2001 | Emma et al. ............ 361/679.05 |
| 6,842,332 | B1 * | 1/2005 | Rubenson et al. ...... 361/679.09 |
| 7,599,181 | B2 * | 10/2009 | Chuang et al. ......... 361/679.55 |

FOREIGN PATENT DOCUMENTS

| JP | 6-215040 | 8/1994 |
| JP | 07-307587 | 11/1995 |
| JP | 2001-34178 | 2/2001 |
| JP | 2004-288149 | 10/2004 |
| JP | 2006-304240 | 11/2006 |

OTHER PUBLICATIONS

"VAIO/TypeL" Sony Corporation, (http://www.vaio.sony.co.jp/Products/L3/feat3.html).
"VAIO/VaioP" Sony Corporation, (http://www.vaio.sony.co.jp/Products/PCV-P101/).
International Search Report for PCT/JP2007/056451, mailed Jul. 3, 2007.
English Translation of the International Preliminary Report on Patentability and Written Opinion mailed Oct. 29, 2009 and issued in corresponding International Patent Application PCT/JP2007/056451.

* cited by examiner

*Primary Examiner*—Jayprakash N Gandhi
*Assistant Examiner*—Anthony M Haughton
(74) *Attorney, Agent, or Firm*—Fujitsu Patent Center

(57) ABSTRACT

An electronic device adapted to stow a keyboard therein in a way screen is exposed even after the keyboard has been stowed in the electronic device. A keyboard module is pivoted for turning on a supporting member supported on a lower section of a pair of frames each of which is made up of two-coupled frames. The keyboard is allowed to turn through a space defined with the pair of frames and also a lower edge of the display module that has been shifted upwards. Thus, the keyboard is allowed to rotate between a using state in which the keyboard is kept with keys lying upward and a stowed state in which the keyboard, after turned in a way a front edge thereof is raised, is kept standing upright and concealed behind the display module which is moved downward.

7 Claims, 36 Drawing Sheets

ELECTRONIC DEVICE AND KEYBOARD MECHANISM

CROSS-REFERENCE TO RELATED APPLICATION

This is a continuation application of PCT/JP2007/056451, filed on Mar. 27, 2007.

TECHNICAL FIELD

The present invention relates to an electronic device equipped with an image display module and a keyboard module, and to a keyboard mechanism equipped with the keyboard module.

BACKGROUND ART

Conventionally, various types of electronic devices have been developed and widely used. Among them, as a personal computer provided with an information calculation function (hereinafter, abbreviated as PC), a portable note PC and a stationary desktop PC are widely used. In the portable note PC, an image display unit having a display screen and a main unit are coupled by means of a hinge member that fastens them so as to be freely closed and opened. The main unit incorporates such as a circuit board on which a central processing unit (CPU) for executing a program and an electronic circuit are mounted, and a hard disk in which information is stored. The main unit also serves as a keyboard with plural operational keys arranged on a top surface of the portable note PC. The stationary desktop PC includes a main unit incorporating a circuit board on which a CPU for executing a program and an electronic circuit are mounted, and a hard disk in which information is stored; an image display device having a display screen for displaying an image; and a keyboard for key operation or the like, each as separate casings.

Recently, an all-in-one desktop PC has been developed and commercialized. This all-in-one type desktop PC incorporates both a main device and an image display device in one case equipped with a handle as well as a folding stand, making the all-in-one desktop PC easy to carry. A keyboard is provided on a lower portion of the case such that a rear edge of the keyboard in a using state in which the keyboard is kept with operational keys lying upward is rotatably supported. The keyboard is rotated in a direction to raise a front edge of the keyboard in the using state, between the using state and a stowed state where a display screen is partially or wholly covered by the keyboard.

DISCLOSURE OF INVENTION

This all-in-one type desktop PC has advantages of easy to carry and protection of a display screen since the keyboard covers the display screen partially or wholly in the stowed state. However, recently, a desktop PC incorporating a TV tuner, for example, which allows a mode in which a keyboard is not required has been introduced to the market. If the above-described feature is applied to this type of desktop PC, it is necessary to move the keyboard from the stowed state to the using state even in the mode in which the keyboard is not needed, since the keyboard covers the display screen partially or wholly in the stowed state. As a result of this, the keyboard that is not used in that mode hangs forward, which may uglify the appearance of the desktop PC.

The present invention is made in consideration of the above-described circumstances, and an object thereof is to provide an electronic device capable of stowing a keyboard therein while exposing a display screen even in a state where the keyboard is stowed, and a keyboard mechanism equipped with such keyboard module.

According to a first aspect of the invention, an electronic device includes:

a pair of frames in a bar shape, each of which standing spaced apart from each other;

an image display module having a display screen on the front thereof, which is supported on the pair of frames so as to slide up and down;

a keyboard module on which operational keys are arranged; and a supporting member supported on the pair of frames, serving to support the keyboard module so as to rotate between a first state in which the keyboard is kept with operational keys lying upward and a second state in which the keyboard module is stood upright and stowed in the rear of the image display module that has been slid downward, around a rotation axis that passes through proximity of a rear edge of the keyboard module in the first state and that extends between the pair of frames, in a direction in which a front edge of the keyboard module in the first state is raised, wherein the keyboard module is rotated between the second state and the first state by passing through a space defined with a lower edge of the image display module and the pair of frames, in a state where the image display module has been slid upward.

In the electronic device of the present invention, the keyboard module is supported so as to rotate between the first state and the second state, on a supporting member provided on a pair of frames in a bar shape each of which standing spaced apart from each other. And the keyboard module rotates through a space defined with a lower end of the image display module and the pair of frames, between the first and the second states, in a state where the image display module that is supported to slide up and down by the pair of frames shifted upward. Further, after the keyboard module is rotated from the first state to the second state, and if the image display module is slid downward, the keyboard module is stowed in the rear of the image display module. Therefore, according to the electronic device of the present invention, even in the second state where the keyboard is stowed, the display screen is exposed. Thereby, if the electronic device of the present invention is a desktop PC that allows a mode in which a keyboard is not required, it is possible to prevent the appearance of the desktop PC from being impaired by the jutting keyboard that is not used in that mode.

In the electronic device of the present invention, it is preferable that the first state is a state in which both the keyboard module and the image display module are usable, and the second state is a state where the keyboard module is unusable and only the image display module is usable, out of the keyboard module and the image display module.

It is also preferable that the frame has a groove that extends in a longitudinal direction of the frame, and the image display module has a projection that slidably fits into the groove.

According to this preferred embodiment, the image display module slides up and down along the groove of the frames, which is preferable.

It is also preferable that the keyboard module is formed of a keyboard stage that is rotatably supported on the supporting member and a keyboard that is detachably mounted on the keyboard stage that is rotated in the first state.

According to this preferred embodiment, in the first state, a user can select both modes: a mode in which the user uses the keyboard while the keyboard is mounted on the keyboard stage; and a mode in which the user uses the keyboard while the keyboard is detached from the keyboard stage, and therefore preferable.

It is also preferable that the keyboard stage has a lock mechanism that detachably locks the keyboard mounted on the keyboard stage.

According to this preferred embodiment, the keyboard is surely locked to the keyboard stage while enabling easy release of locking, which is preferable.

It is also preferable that the supporting member is formed of a pair of supporting pieces respectively supported on the pair of frames.

According to this embodiment, it is possible to downsize the supporting member, which is preferable.

It is also preferable that the image display module includes: a display panel having the display screen on the front; and an up-and-down motion mechanism that moves the display panel up and down with respect to the pair of frames, wherein the up-and-down motion mechanism includes: an extendable pole that extends and contracts in an up-and-down direction; a first member that is fixed to one end of the extendable pole out of both upper and lower ends of the extendable pole as well as fixed to the display panel, and that slides up and down relative to the frames; a second member that is fixed to the other end of the extendable pole out of both upper and lower ends of the extendable pole as well as fixed to the frame, and that slides up and down relative to the display panel.

According to this preferred embodiment, with the extension and contraction of the extendable pole in the direction of up and down, the first member slides up and down relatively with respect to the frames, and when the second member slides up and down relatively with respect to the display panel, the display panel is caused to slide up and down with respect to the pair of frames, which is preferable.

It is also preferable that the extendable pole is an up-and-down damper that supports the display panel in a flexible extended state.

According to this preferred embodiment, the display panel slides up and down smoothly, which is preferable.

It is also preferable that the frame has a groove that extends in a longitudinal direction of the frame, and the first member has a projection that slidably fits into the groove.

According to this preferred embodiment, the first member slides up and down along the groove of the frames, which is preferable.

According to a second aspect of the invention, a keyboard mechanism includes:

a pair of frames in a bar shape, each of which standing spaced apart from each other, serving to support an image display module having a display screen on the front so as to slide up and down;

a keyboard module on which operational keys are arranged; and a supporting member supported on the pair of frames, serving to support the keyboard module so as to rotate between a first state in which the keyboard is kept with operational keys lying upward and a second state in which the keyboard module is stood upright and stowed in the rear of the image display module that has been slid downward, around a rotation axis that passes through proximity of a rear edge of the keyboard module in the first state and that extends between the pair of frames, in a direction in which a front edge of the keyboard module in the first state is raised.

The keyboard mechanism of the present invention supports the keyboard module so as to rotate between the first state and the second state, by the supporting member supported on the pair of frames in a bar shape each of which standing spaced apart from each other. The pair of frames serves to support an image display module having a display screen on the front so as to slide up and down. And the keyboard module is stowed in the rear of the image display module in the second state. Therefore, according to the keyboard mechanism of the present invention, when the keyboard mechanism is used along with the image display module, even when the keyboard module is in the second state, the display screen is exposed. As such, if the keyboard mechanism of the present invention is applied to a desktop PC that allows the mode in which a keyboard is not required, it is possible to prevent the appearance of the desktop PC from being impaired by the jutting keyboard that is not used in that mode.

It is also preferable that the first state is a state where both the keyboard module and the image display module are usable, and the second state is a state where the keyboard module is unusable and only the image display module is usable, out of the keyboard module and the image display module.

It is also preferable that the keyboard module includes a keyboard stage that is rotatably supported on the supporting member and a keyboard that is detachably mounted on the keyboard stage that is rotated in the first state.

According to this preferred embodiment, in the first state, a user can select both modes: a mode in which the user uses the keyboard while the keyboard is mounted on the keyboard stage; and a mode in which the user uses the keyboard while the keyboard is detached from the keyboard stage, and therefore preferable.

It is also preferable that the keyboard stage has a lock mechanism that detachably locks the keyboard mounted on the keyboard stage.

According to this preferred embodiment, the keyboard is surely locked to the keyboard stage while enabling easy release of locking, which is preferable.

It is also preferable that the supporting member is formed of a pair of supporting pieces respectively supported on the pair of frames.

According to this preferred embodiment, it is possible to downsize the supporting member, which is preferable.

According to the present invention, it is possible to provide an electronic device adapted to stow a keyboard therein in a way screen is exposed even after the keyboard has been stowed in the electronic device, and a keyboard mechanism equipped with such keyboard module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BEST MODE FOR CARRYING OUT THE INVENTION

Hereinafter, embodiments of the present invention will be described with reference to drawings.

Herein, as an example of an electronic device, description will be made about a stationary desktop personal computer that includes a main unit incorporating a circuit board on which a central processing unit (CPU) for executing a program and an electronic circuit are mounted, a hard disk for storing information and the like; an image display unit having a display screen for displaying an image; and a keyboard for performing key operation, each as separate casings (hereinafter, the desktop personal computer is abbreviated as a desktop PC).

Figure 1:
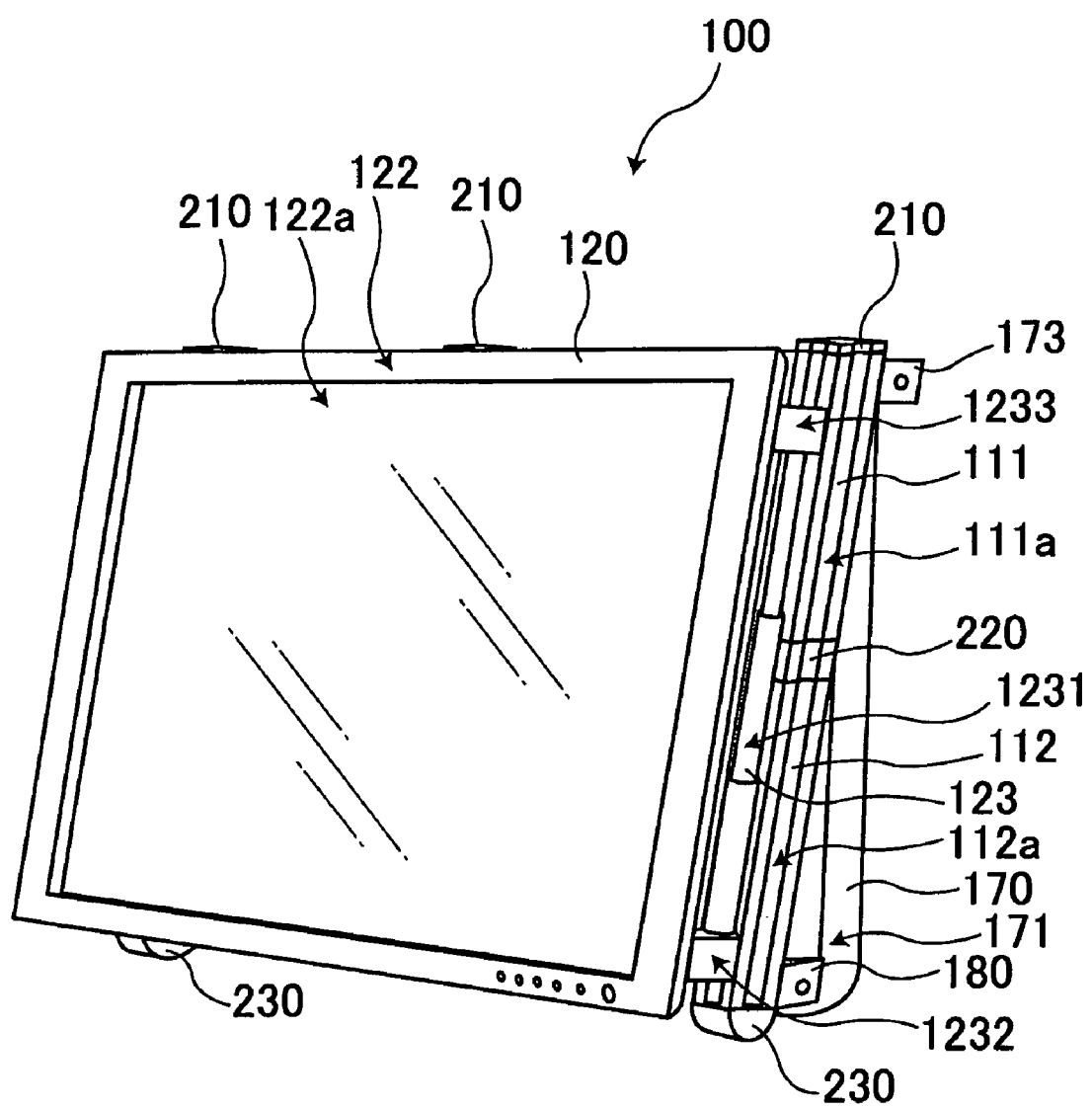
FIG. 1 is a front external perspective view of a desktop PC, laterally obliquely seen.
Figure 2:
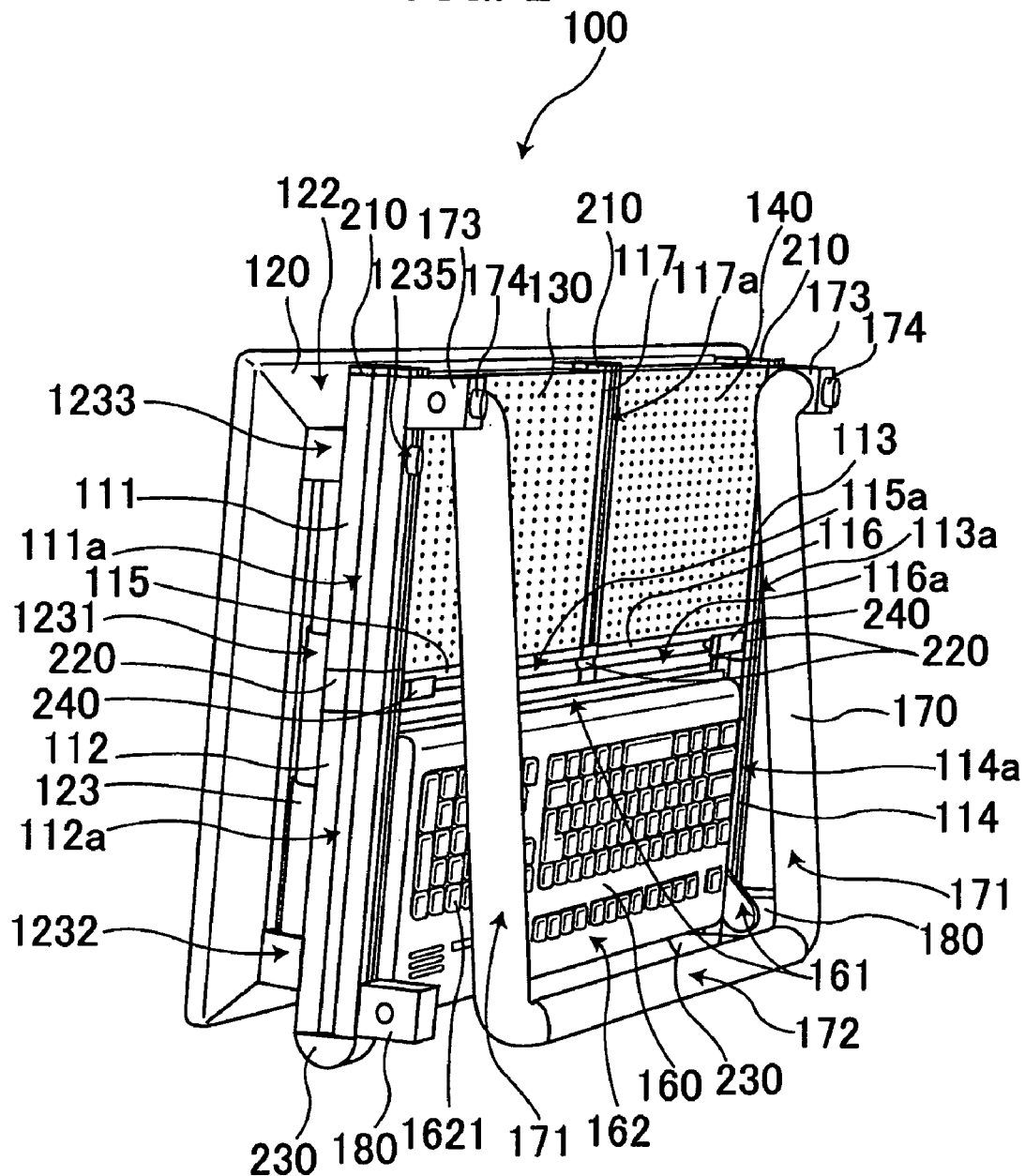
FIG. 2 is a rear external perspective view of the desktop PC illustrated in FIG. 1, laterally obliquely seen.
Figure 3:
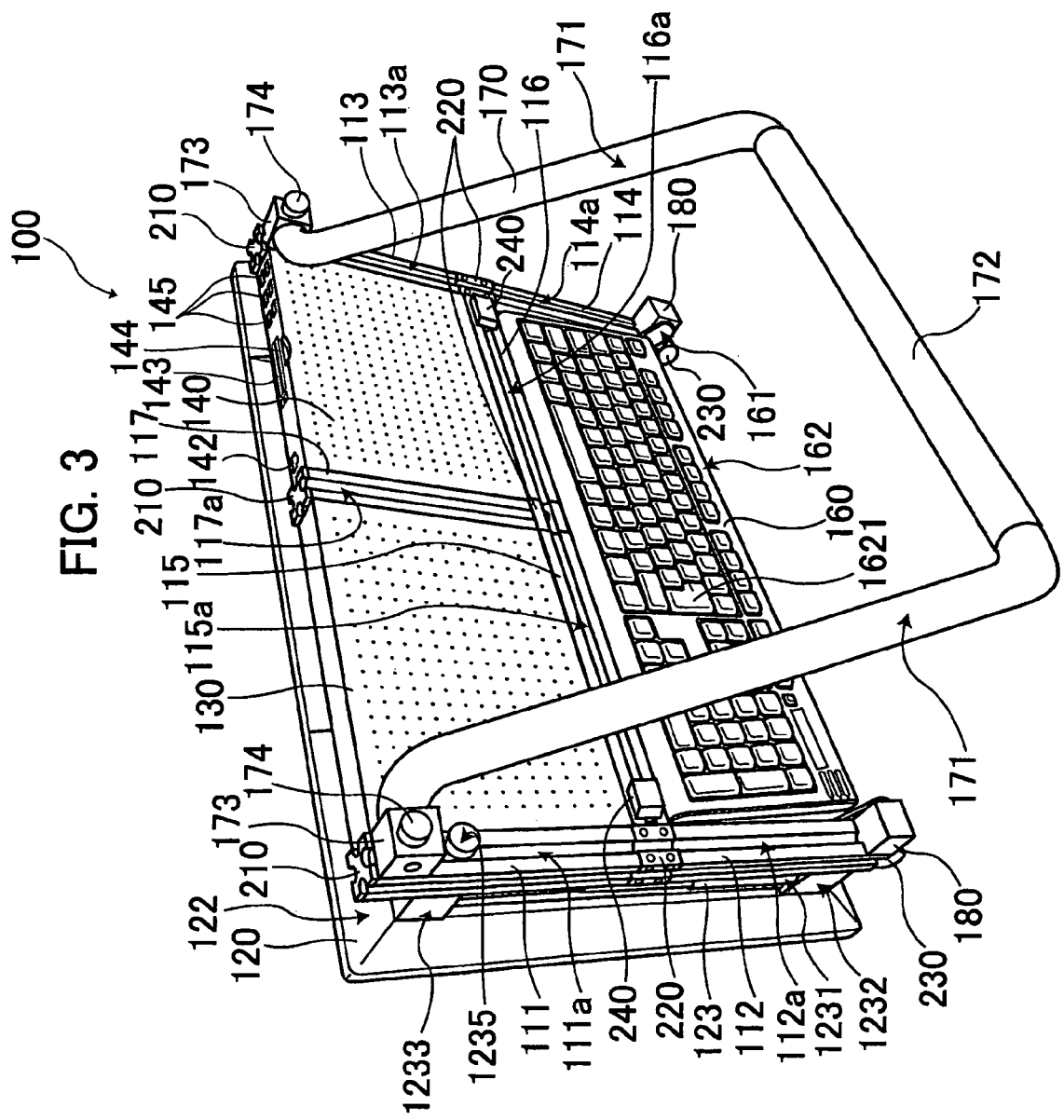
FIG. 3 is a rear external perspective view of the desktop PC in a using state in which a stand illustrated in FIG. 2 is opened at an angle of predetermined degrees, laterally obliquely seen.
Figure 4:
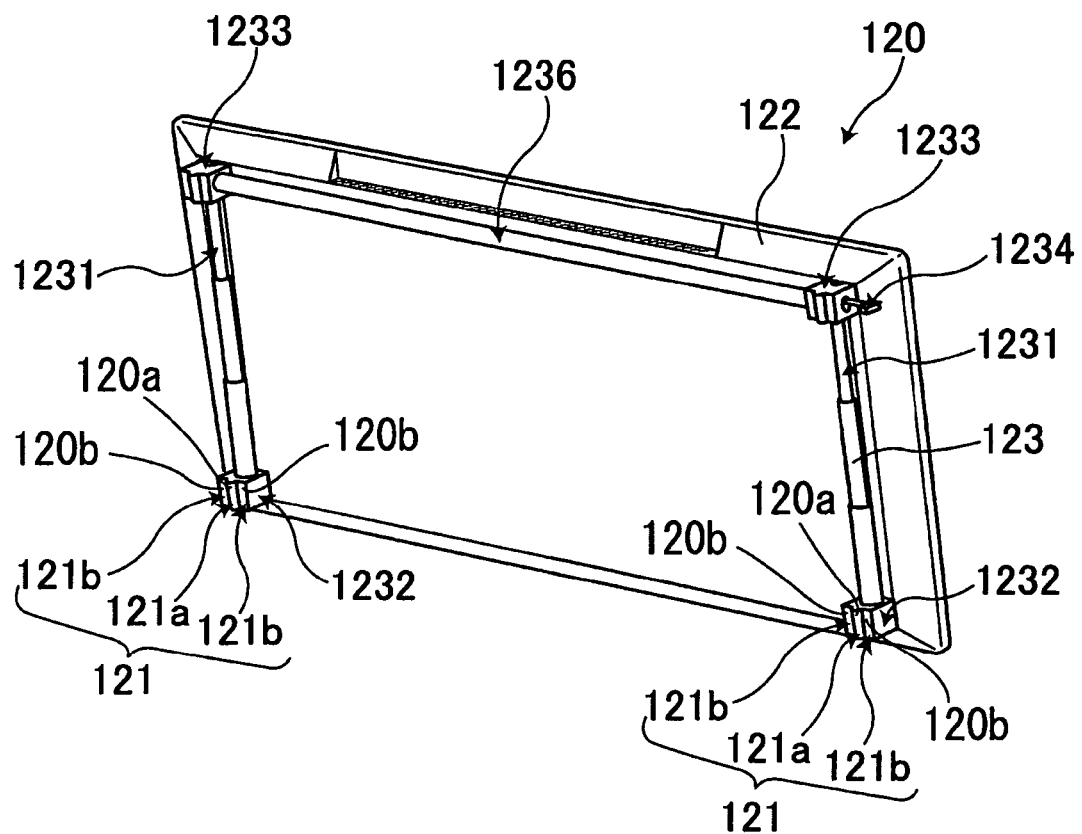
FIG. 4 is a rear external perspective view of an image display module illustrated in FIGS. 1 to 3, obliquely seen from above.
Figure 5:
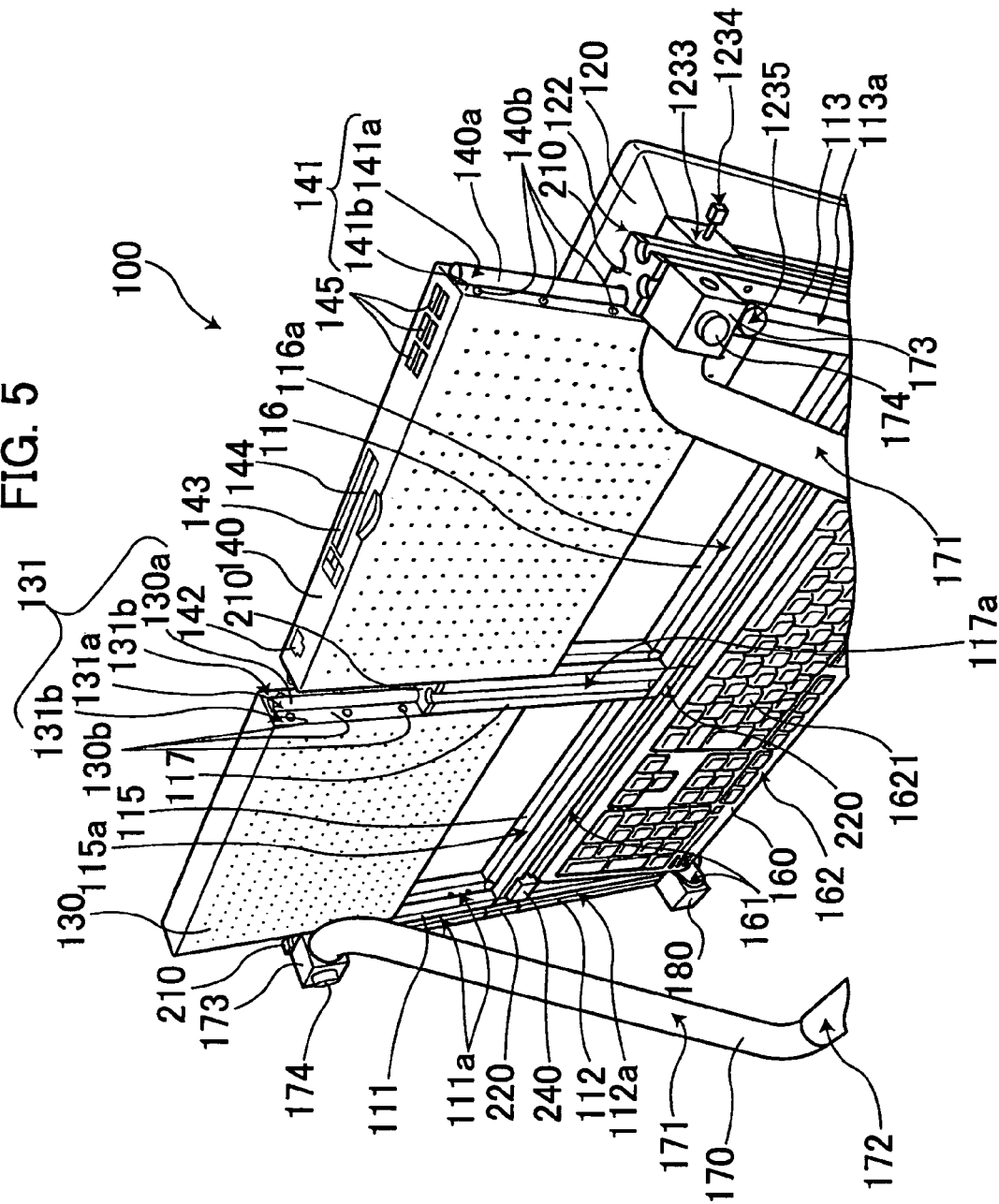
FIG. 5 is a rear external perspective view of the desktop PC in a state in which a main unit module and a connector module illustrated in FIGS. 2 and 3 are slid upward, laterally obliquely seen.
Figure 6:
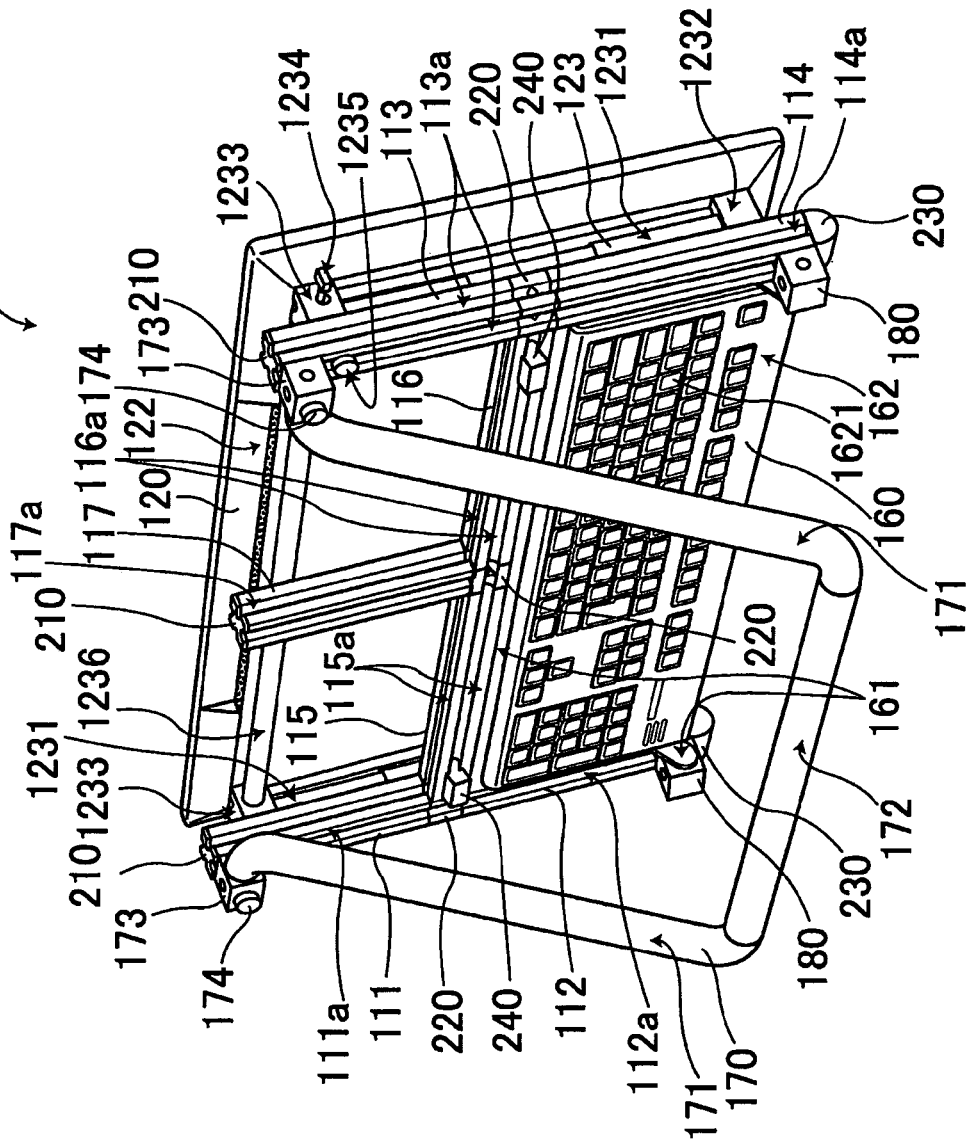
FIG. 6 is a rear external perspective view of the desktop PC in a state in which the main unit module and the connector module illustrated in FIG. 5 are further slid upward and detached, laterally obliquely seen.

FIG. 1 is a front external perspective view of a desktop PC 100, laterally obliquely seen; FIG. 2 is a rear external perspective view of the desktop PC 100 illustrated in FIG. 1, laterally obliquely seen; and FIG. 3 is a rear external perspective view of the desktop PC 100 in a using state in which a stand 170 illustrated in FIG. 2 is opened at an angle of predetermined degrees, laterally obliquely seen. FIG. 4 is a rear external perspective view of an image display module 120 illustrated in FIGS. 1 to 3, obliquely seen from above; FIG. 5 is a rear external perspective view of the desktop PC 100 in a state in which a main unit module 130 and a connector module 140 illustrated in FIGS. 2 and 3 are slid upward, laterally obliquely seen; and FIG. 6 is a rear external perspective view of the desktop PC 100 in a state in which the main unit module 130 and the connector module 140 illustrated in FIG. 5 are further slid upward and detached, laterally obliquely seen.

The desktop PC 100 illustrated in FIGS. 1 to 3 has processing ability similar to that of a general personal computer, and is provided with the hard disk device and the central processing unit (CPU) therein.

Also, the desktop PC 100 has grooves 111a, 112a, 113a, 114a, 115a, 116a and 117a extending in a longitudinal direction in appearance as illustrated in FIGS. 1 to 3, 5 and 6; seven frames 111, 112, 113, 114, 115, 116 and 117 having a bar-shape; and three joint parts 220 for coupling the frames 111, 112, 113, 114, 115, 116 and 117. Herein, six frames 111, 112, 113, 114, 115 and 116 out of the seven frames 111, 112, 113, 114, 115, 116 and 117 are coupled two by two by using the joint parts 220, and a pair of frames formed of two coupled frames 111 and 112 and two coupled frames 113 and 114 are vertically arranged so as to be parallel to each other with an interval therebetween, and the pair of frames are connected by two coupled frames 115 and 116 with the joint parts 220 respectively, and further, one remaining frame 117 is coupled to an intermediate upper portion between the pair of frames so as to be parallel thereto by using the joint part 220 coupling the frames 115 and 116.

Also, the desktop PC 100 is provided with the image display module 120 having a frame receiving section 121 detachably supported so as to be slidable up and down by the pair of frames formed of two coupled frames 111 and 112 and the two coupled frames 113 and 114 out of the seven frames 111, 112, 113, 114, 115, 116 and 117, as illustrated in FIGS. 1 to 6. Also, the main unit module 130 having a frame receiving section 131 detachably supported so as to be slidable up and down by the upper frame 111 of the two coupled frames 111 and 112 of one of the pair of frames and the remaining one frame 117 is included. Also, the connector module 140 having a frame receiving section 141 detachably supported so as to be slidable up and down by the upper frame 113 of the two coupled frames 113 and 114 of the other of the pair of frames and the remaining one frame 117 is included.

The image display module 120 includes a display panel 122 having a display screen 122*a* on the front, and an up-and-down motion mechanism 123 that allows the display panel 122 to move up and down relative to the pair of frames formed of the two coupled frames 111 and 112 and the two coupled frames 113 and 114, as illustrated in FIGS. 1 to 6.

The up-and-down motion mechanism 123 includes two up-and-down dampers 1231 that are extendable poles extending in an up-and-down direction for supporting the display panel 122 in a flexible extending state; first members 1232 fixed to lower ends of upper and lower ends of the two up-and-down dampers 1231 and fixed to a lower right end and a lower left end of a rear surface of the display panel 122 to be slidable up and down relative to the pair of frames; and second members 1233 fixed to upper ends of the upper and lower ends of the two up-and-down dampers 1231 and fixed to the upper ends of the pair of frames with bolts 1235 to be slidable up and down relative to the display panel 122.

Also, the two up-and-down dampers 1231 are such that the second members 1233 fixed to the upper ends are coupled by means of a hollow steel pipe 1236 as illustrated in FIGS. 4 and 6, and a wire (not illustrated) passes through the steel pipe 1236. A lever 1234 is provided on the second member 1233 fixed to the upper end of the up-and-down damper 1231, on a side in which the first member 1232 is fixed to the lower right end of the rear surface of the display panel 122, out of the two up-and-down dampers 1231. When the lever 1234 is operated, a pressure is applied to both of the up-and-down dampers 1231 through the wire in the steel pipe 1236, enabling the display panel 122 to move up and down relative to the pair of frames formed of the two coupled frames 111 and 112 and the two coupled frames 113 ad 114.

The display panel 122 is allowed to smoothly slide up and down by such up-and-down dampers 1231.

Also, as illustrated in FIG. 4, the first member 1232 has a protrusion 121*a* that slidably and detachably fits in the grooves 111*a*, 112*a*, 113*a* and 114*a* of the pair of frames formed of the two coupled frames 111 and 112 and the two coupled frames 113 and 114, and wall surfaces 121*b* on both sides of the protrusion 121*a* have shapes to abut wall surfaces on both sides of the grooves 111*a*, 112*a*, 113*a* and 114*a* of the frames 111, 112, 113 and 114, respectively. A combination of the protrusion 121*a* and the wall surfaces 121*b* is the frame receiving section 121 of the image display module 120. Also, the protrusion 121*a* of the frame receiving section 121 is provided with an image display module side power terminal 120*a*, which is supplied with electric power from the frames 111, 112, 113 and 114. Also, an image display module side signal terminal 120*b*, which transmits a signal between the image display module 120 and the outside, is provided on the wall surface 121*b* of the frame receiving section 121. Therefore, since the frame receiving section 121 is surely supported by the frames 111, 112, 113 and 114, the image display module side power terminal 120*a* and a frame side power terminal 1111 (refer to FIG. 7) are surely connected, and the image display module side signal terminal 120*b* and a frame side signal terminal 1112 are also surely connected (refer to FIG. 7).

The main unit module 130 is the module incorporating a circuit board on which a CPU for executing a program and an electronic circuit is mounted, and a hard disk in which information is stored. The main unit module 130 has protrusions 131*a* that slidably and detachably fit in the grooves 111*a* and 117*a* of the frames 111 and 117, respectively, on both right and left side surfaces of the main unit module 130, and wall surfaces 131*b* on both sides of the protrusion 131*a* have shapes to abut wall surfaces on both sides of the grooves 111*a* and 117*a* of the frames 111 and 117, respectively, as illustrated in FIG. 5. A combination of the protrusion 131*a* and the wall surfaces 131*b* is the frame receiving section 131 of the main unit module 130. Also, the protrusion 131*a* of the frame receiving section 131 is provided with a main unit module side power terminal 130*a*, which is supplied with the electric power from the frames 111 and 117. Also, the wall surface 131*b* of the frame receiving section 131 is provided with a main unit module side signal terminal 130*b*, which transmits the signal between the main unit module 130 and the outside. Therefore, since the frame receiving section 131 is surely supported by the frames 111 and 117, the main unit module side power terminal 130*a* and the frame side power terminal 1111 (refer to FIG. 7) are surely connected, and a main unit module side signal terminal 130*b* and the frame side signal terminal 1112 are also surely connected (refer to FIG. 7).

The connector module 140 is the module provided with a data communication connector 142 to which a communication cable (not illustrated) for data communication is connected, a media slot 143 to which a recording medium (not illustrated) is removably inserted, a PC card slot 144 to which a PC card (not illustrated) is removably inserted, and a USB (Universal Serial Bus) connector 145 to which a USB cable (not illustrated) is connected. The connector module 140 has protrusions 141*a*, which slidably and detachably fit in the grooves 113*a* and 117*a* of the frames 113 and 117, respectively, on both right and left side surfaces of the connector module 140, and wall surfaces 141*b* on both sides of the protrusion 141*a* have shapes to abut wall surface on both sides of the grooves 113*a* and 117*a* of the frames 113 and 117, respectively, as illustrated in FIG. 5. A combination of the protrusion 141*a* and the wall surface 141*b* is the frame receiving section 141 of the connector module 140. Also, the protrusion 141*a* of the frame receiving section 141 is provided with a connector module side power terminal 140*a*, which is supplied with the electric power from the frames 113 and 117. Also, the wall surface 141*b* of the frame receiving section 141 is provided with a connector module side signal terminal 140*b*, which transmits the signal between the connector module 140 and the outside. Therefore, since the frame receiving section 141 is surely supported by the frames 113 and 117, the connector module side power terminal 140*a* and the frame side power terminal 1111 (refer to FIG. 7) are surely connected, and the connector module side signal terminal 140*b* and the frame side signal terminal 1112 (refer to FIG. 7) are also surely connected.

Figure 7:
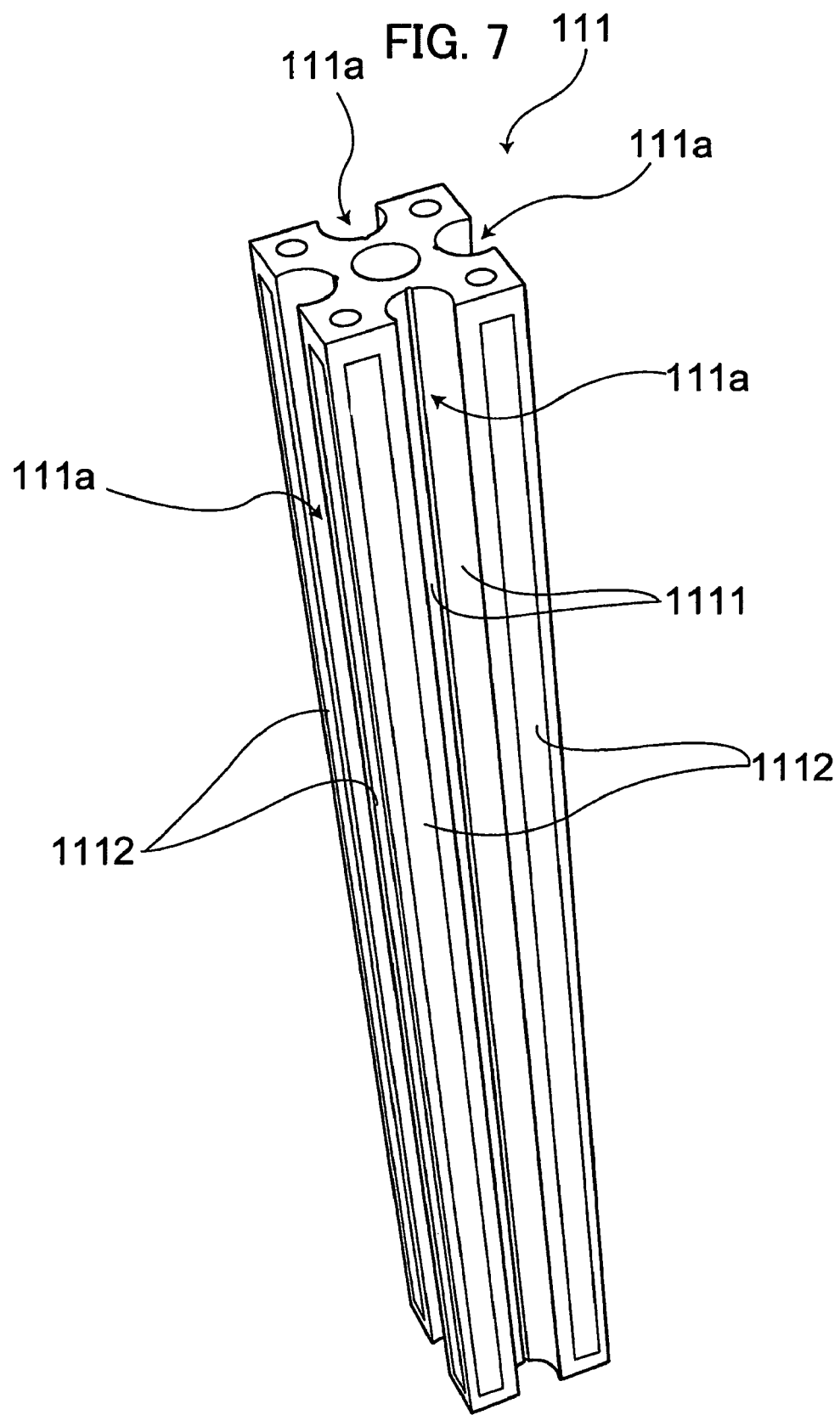
FIG. 7 is an enlarged view of the frame illustrated in FIGS. 1 to 6.

FIG. 7 is an enlarged view of the frame 111 illustrated in FIGS. 1 to 6, and FIG. 8 is an enlarged view of the joint part 220 illustrated in FIGS. 1 to 6, and the frame 111 is provided with the frame side power terminal 1111, which supplies the electric power to the image display module side power terminal 120*a* (refer to FIG. 4), the main unit module side power terminal 130*a* (refer to FIG. 5) and the connector module side power terminal 140*a* (refer to FIG. 5) in a state in which the frame receiving section 121 of the image display module 120 (refer to FIG. 4), the frame receiving section 131 of the main unit module 130 (refer to FIG. 5) and the frame receiving section 141 of the connector module 140 (refer to FIG. 5) are supported by the frame 111, on the groove 111*a* portion of the frame 111, as illustrated in FIG. 7.

Also, the frame 111 is provided with the frame side signal terminals 1112, which relay the signal transmitted between each module of the image display module side signal terminal 120*b* (refer to FIG. 4), the main unit module side signal terminal 130*b* (refer to FIG. 5) and the connector module side signal terminal 140*b* (refer to FIG. 5) and between each module and the outside, on the wall surface portions on both sides of the groove 111*a* of the frame 111 as illustrated in FIG. 7.

Meanwhile, although other frames 112, 113, 114, 115, 116 and 117 illustrated in FIGS. 1 to 6 are also provided with the frame side power terminal 1111 and the frame side signal terminals 1112, as in the case of the frame 111 illustrated in FIG. 7, they are not herein illustrated.

Figure 8:
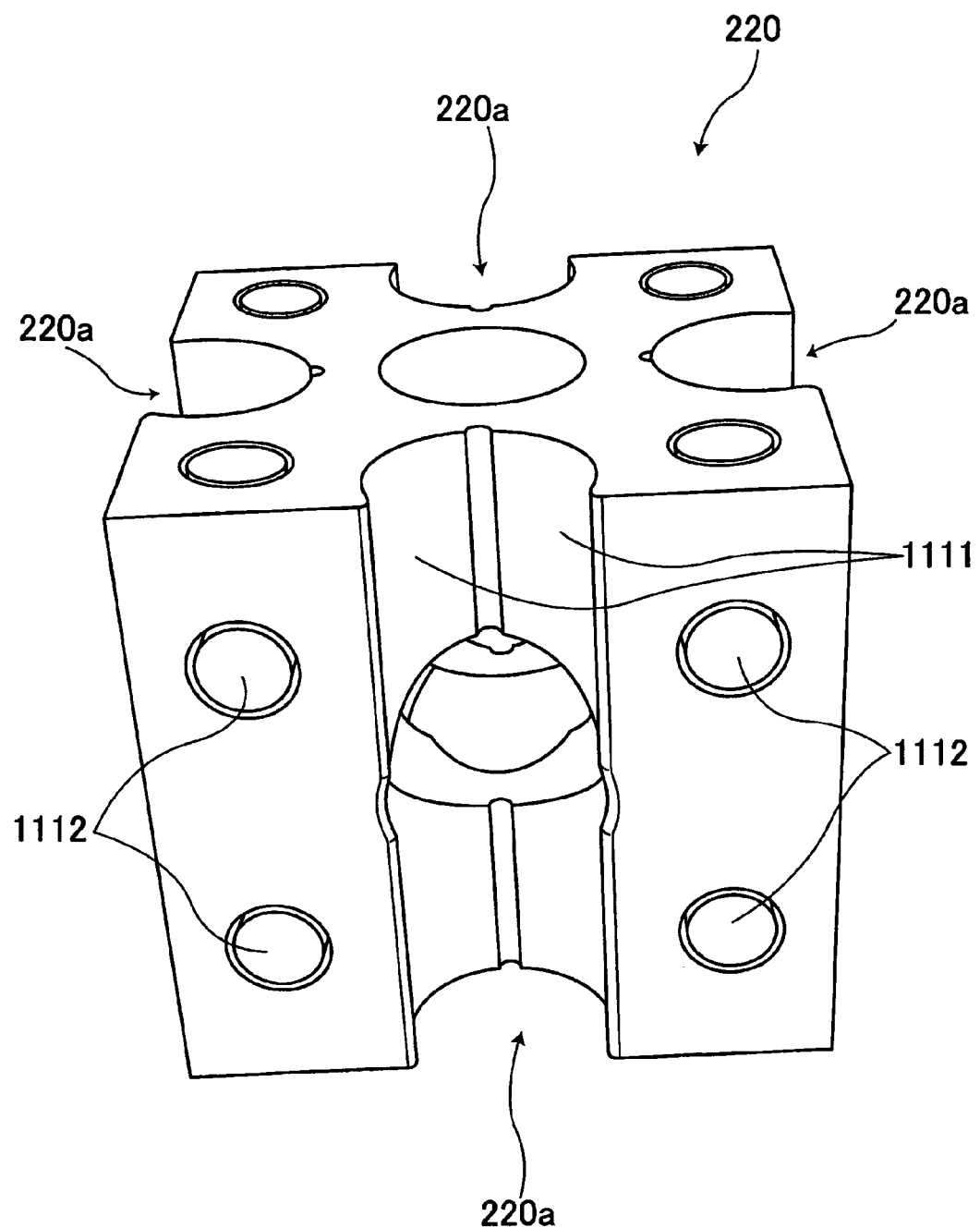
FIG. 8 is a joint part illustrated in FIGS. 1 to 6.

Also, the joint part 220 has a groove 220*a* as illustrated in FIG. 8, and the frame side power terminal 1111 is provided on the groove 220*a* portion. Also, the frame side signal terminals 1112 are provided on the wall surface portions on both sides of the groove 220*a*.

In this manner, the image display module side power terminal 120*a*, the main unit module side power terminal 130*a* and the connector module side power terminal 140*a* in a state in which the frame receiving section 121 of the image display module 120 (refer to FIG. 4), the frame receiving section 131 of the main unit module 130 (refer to FIG. 5) and the frame receiving section 141 of the connector module 140 (refer to FIG. 5) are supported by the frames 111, 112, 113, 114, 115, 116 and 117, are supplied with the electric power from the frame side power terminal 1111 provided on the frames 111, 112, 113, 114, 115, 116 and 117 and the joint parts 220. Therefore, it is not necessary to connect the power cable for supplying the electric power to the image display module 120, the main unit module 130 and the connector module 140, so that trouble of connection and handling of the power cable may be avoided.

Also, it is not necessary to connect the signal transmission cable to each module when realizing the transmission of the signal between each module and between each module and the outside, so that trouble of connection and handling of the signal transmission cable may be avoided.

Figure 9:
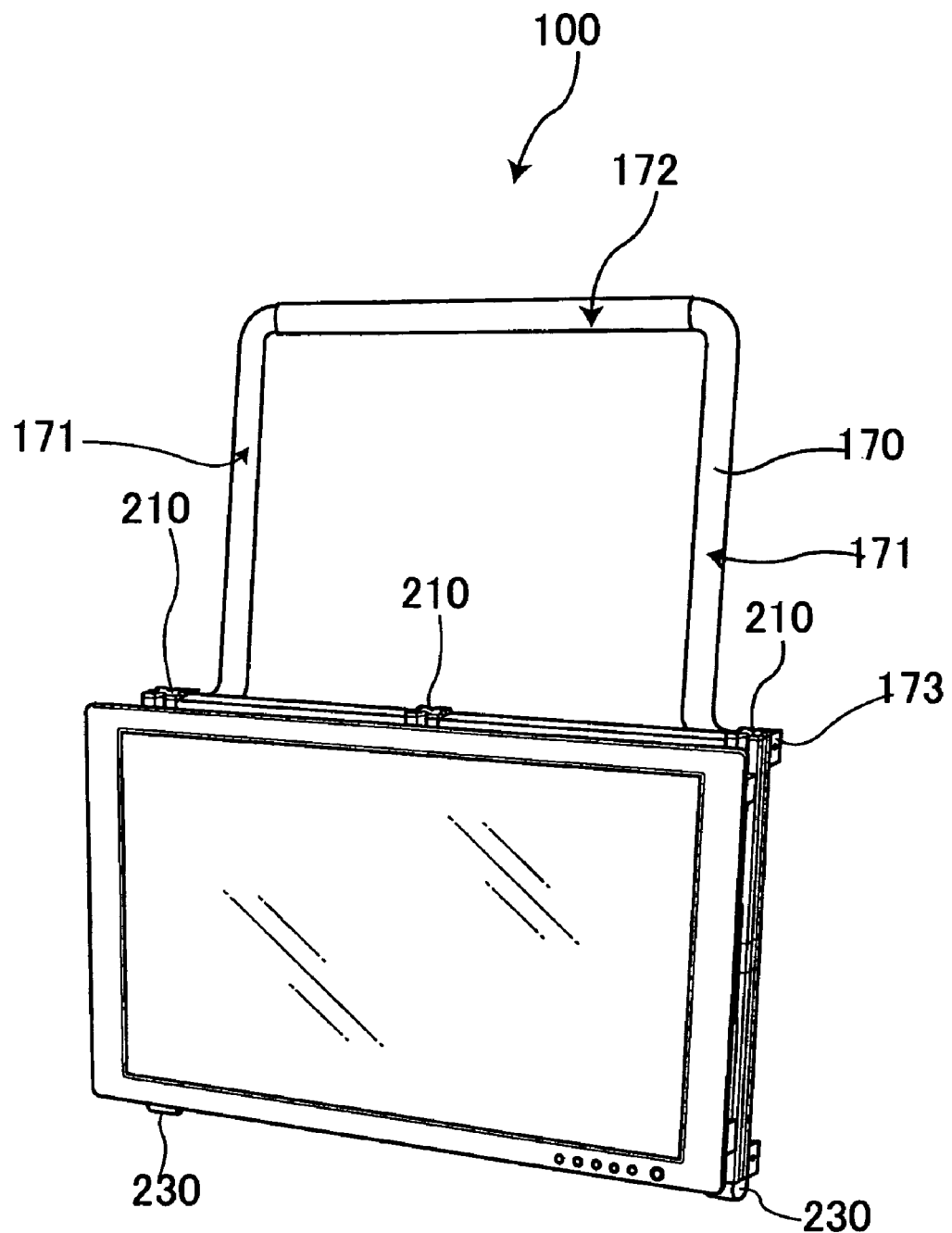
FIG. 9 is a rear external perspective view of the desktop PC in an opened state in which the stand illustrated in FIGS. 1 to 3 is opened at an angle of approximately 180 degrees from a folding state, laterally obliquely seen.
Figure 10:
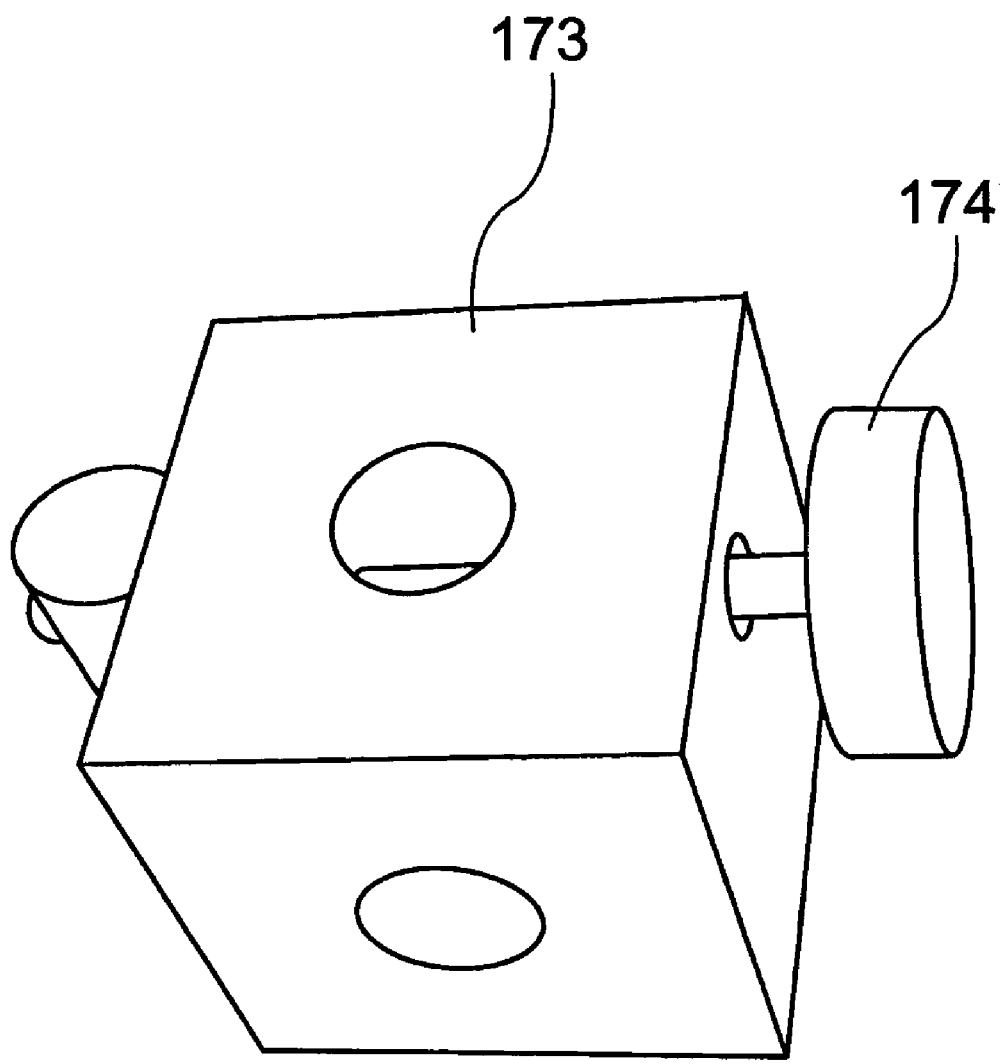
FIG. 10 is an enlarged view of an arm section supporting member 173 a bolt illustrated in FIGS. 1 to 3, 5, 6 and 9.

FIG. 9 is a rear external perspective view of the desktop PC 100 in an opened state in which the stand 170 illustrated in FIGS. 1 to 3 is opened at an angle of approximately 180 degrees from a folding state, laterally obliquely seen. Also, FIG. 10 is an enlarged view of an arm section supporting member 173 and a bolt 174 illustrated in FIGS. 1 to 3, 5, 6 and 9.

The desktop PC 100 is provided with the stand 170 having a pair of arm sections 171 of which one ends are rotatably supported on upper portions of the pair of frames formed of the two coupled frames 111 and 112 and the two coupled frames 113 and 114 when the image display module 120 is stood by means of the arm section supporting member 173 fixed with the bolt 174; and a rod section 172 for connecting the other ends of the pair of arm sections 171, as illustrated in FIGS. 1 to 3, 5, 6, 9 and 10.

Also, the stand 170 is rotatable among a folded state illustrated in FIGS. 1 and 2 in which the stand 170 is overlapped with the image display module 120, the using state illustrated in FIG. 3 in which the stand 170 is opened at an angle of predetermined degrees from the image display module 120 and is used as the stand to obliquely stand the image display module 120, and the opened state illustrated in FIG. 9 in which the stand 170 is opened at an angle of approximately 180 degrees from the folded state and is used as a handle when carrying the image display module 120.

In this manner, since the stand 170 may be folded, used as the stand to obliquely stand the desktop PC 100, and used as the handle when carrying the desktop PC 100, so that the number of components and the number of assembling steps are reduced relative to those of a conventional electronic device including the handle and the stand as separate components, and a manufacturing cost thereof is reduced.

Also, according to the stand 170, a load relative to the display panel 122 of the image display module 120 when using the stand 170 as the handle when carrying the desktop PC 100 is distributed in comparison to a structure in which the pair of arm sections are directly pivotally supported by the image display module 120.

Also, the desktop PC 100 is provided with a nonslip rubber 230 illustrated in FIGS. 1 to 3, 5, 6 and 9. Herein, the nonslip rubbers 230 are provided on lower ends of the pair of frames formed of the two coupled frames 111 and 112 and the two coupled frames 113 and 114, and a state in which the desktop PC 100 is obliquely stood is stably maintained in the using state illustrated in FIG. 3.

Figure 11:
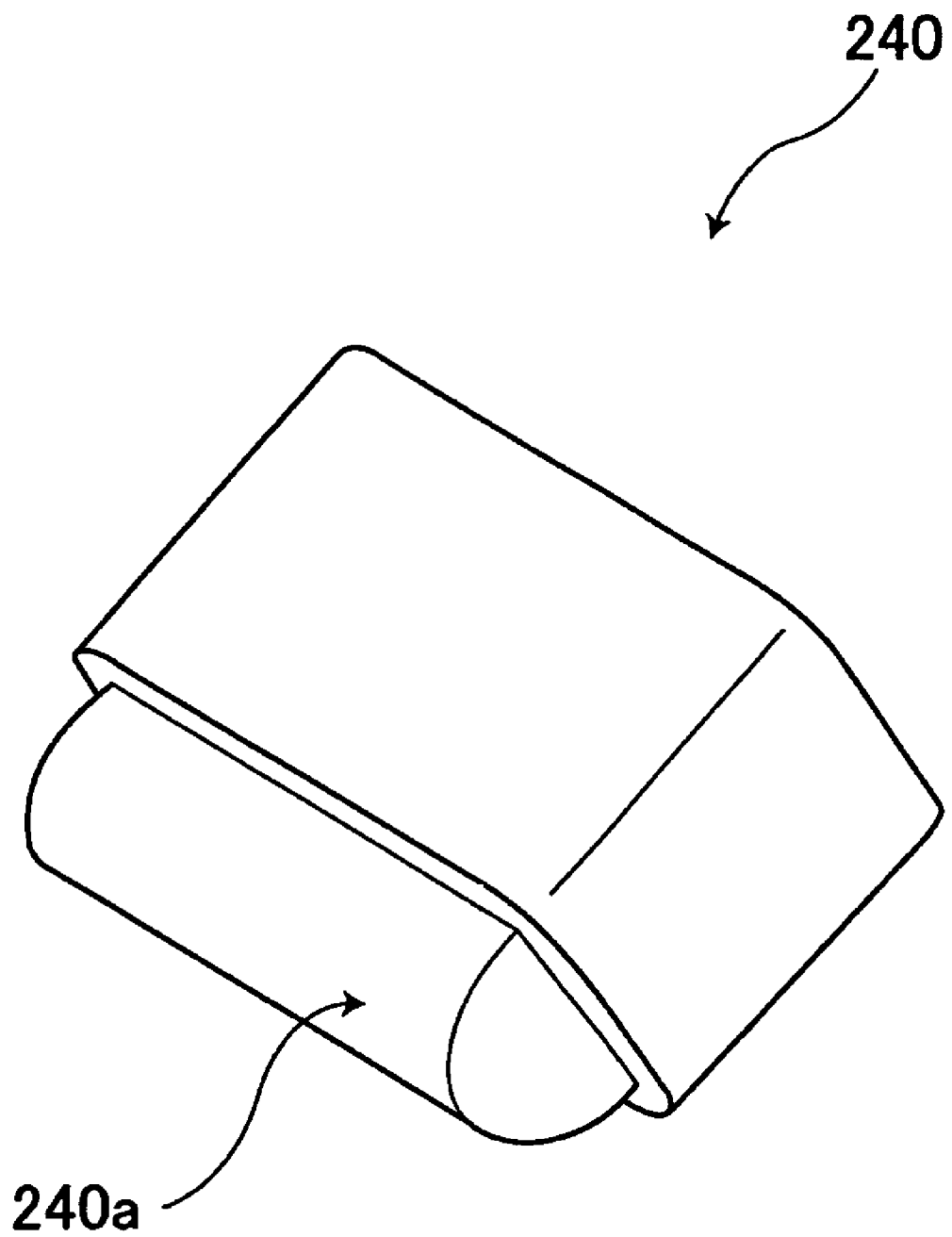
FIG. 11 is an enlarged view of a handle stopper rubber illustrated in FIGS. 2, 3, 5 and 6.
Figure 12:
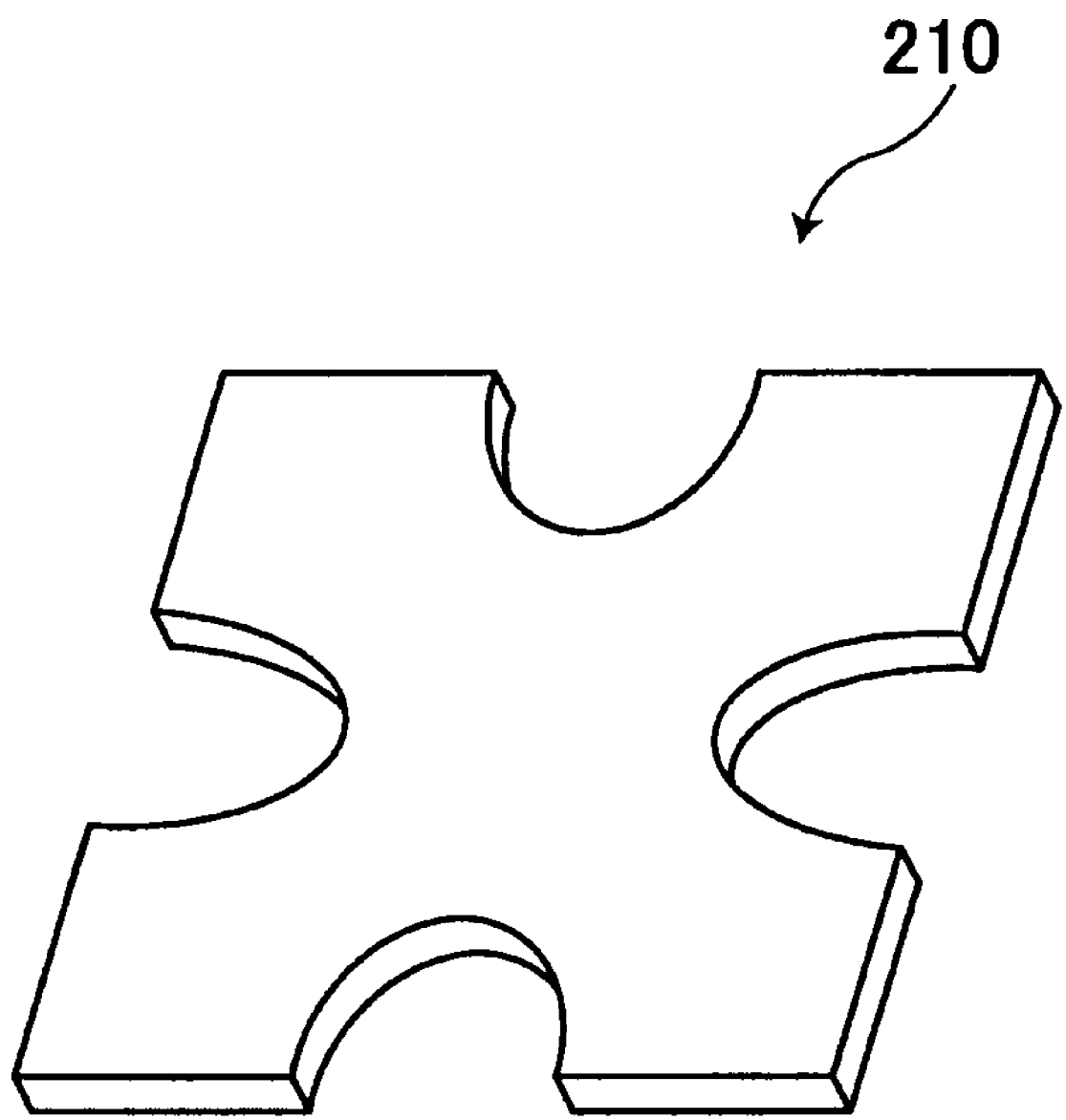
FIG. 12 is an enlarged view of a cap illustrated in FIGS. 1 to 3, 5, 6 and 9.

FIG. 11 is an enlarged view of a handle stopper rubber 240 illustrated in FIGS. 2, 3, 5 and 6, and FIG. 12 is an enlarged view of a cap 210 illustrated in FIGS. 1 to 3, 5, 6 and 9.

The desktop PC 100 is provided with the handle stopper rubber 240 illustrated in FIGS. 2, 3, 5, 6 and 11. The handle stopper rubber 240 is made of an elastic material having a convex stripe 240*a*, which detachably fits in the grooves 111*a*, 112*a*, 113*a*, 114*a*, 115*a*, 116*a* and 117*a* formed on the frames 111, 112, 113, 114, 115, 116 and 117, respectively. Herein, the handle stopper rubbers 240 are provided on both right and left ends of the two coupled frames 115 and 116 connected between the pair of frames by using the joint parts 220 in the pair of frames formed of the two coupled frames 111 and 112 and the two coupled frames 113 and 114.

Such handle stopper rubber 240 prevents the stand 170 from colliding with the device in the folded state illustrated in FIGS. 1 and 2.

Also, the desktop PC 100 is provided with the cap 210 illustrated in FIGS. 1 to 3, 5, 6, 9 and 12. The cap 210 is formed of an elastic material, which fits in the ends of the frames 111, 112, 113, 114, 115, 116 and 117. Herein, the caps 210 fit in the upper ends of the frames 111, 113 and 117 of which ends are exposed.

The cap 210 prevents the user from being injured by touching the ends of the frames 111, 113 and 117.

Figure 13:
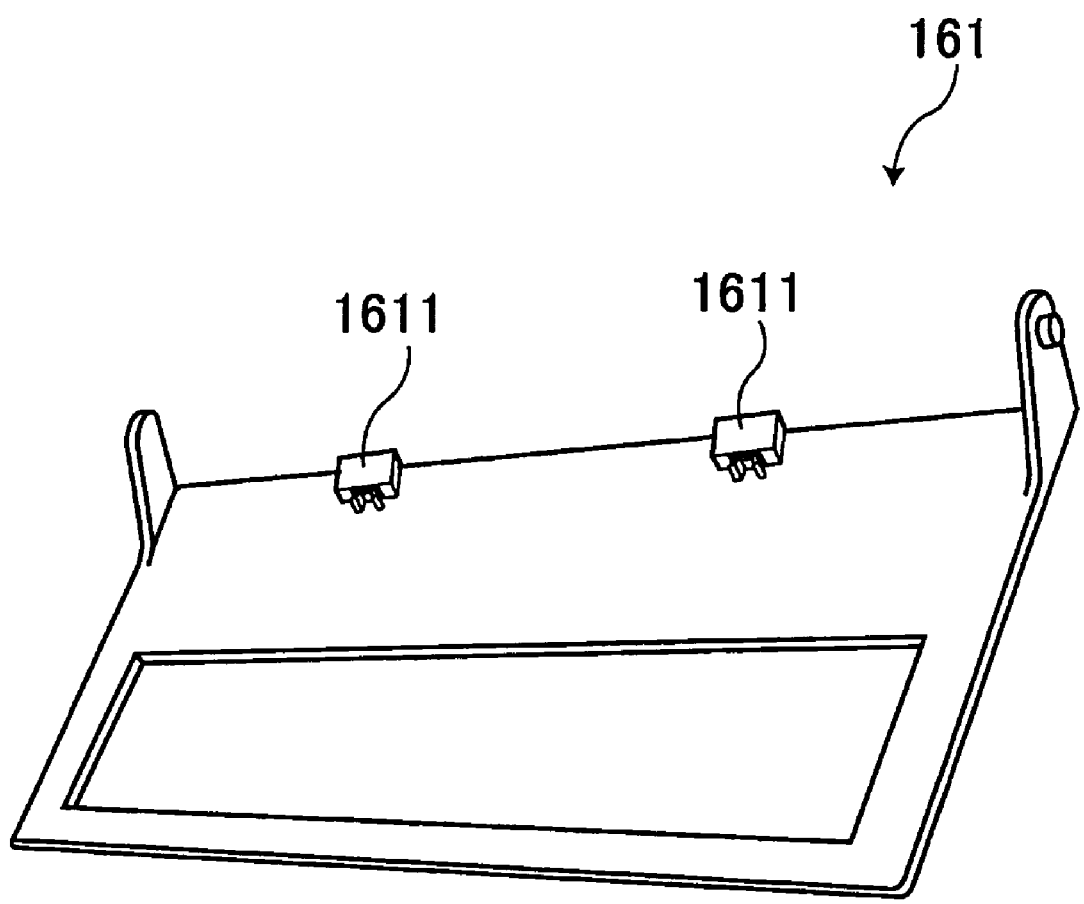
FIG. 13 is an enlarged view of a keyboard stage illustrated in FIGS. 2, 3, 5 and 6.
Figure 14:
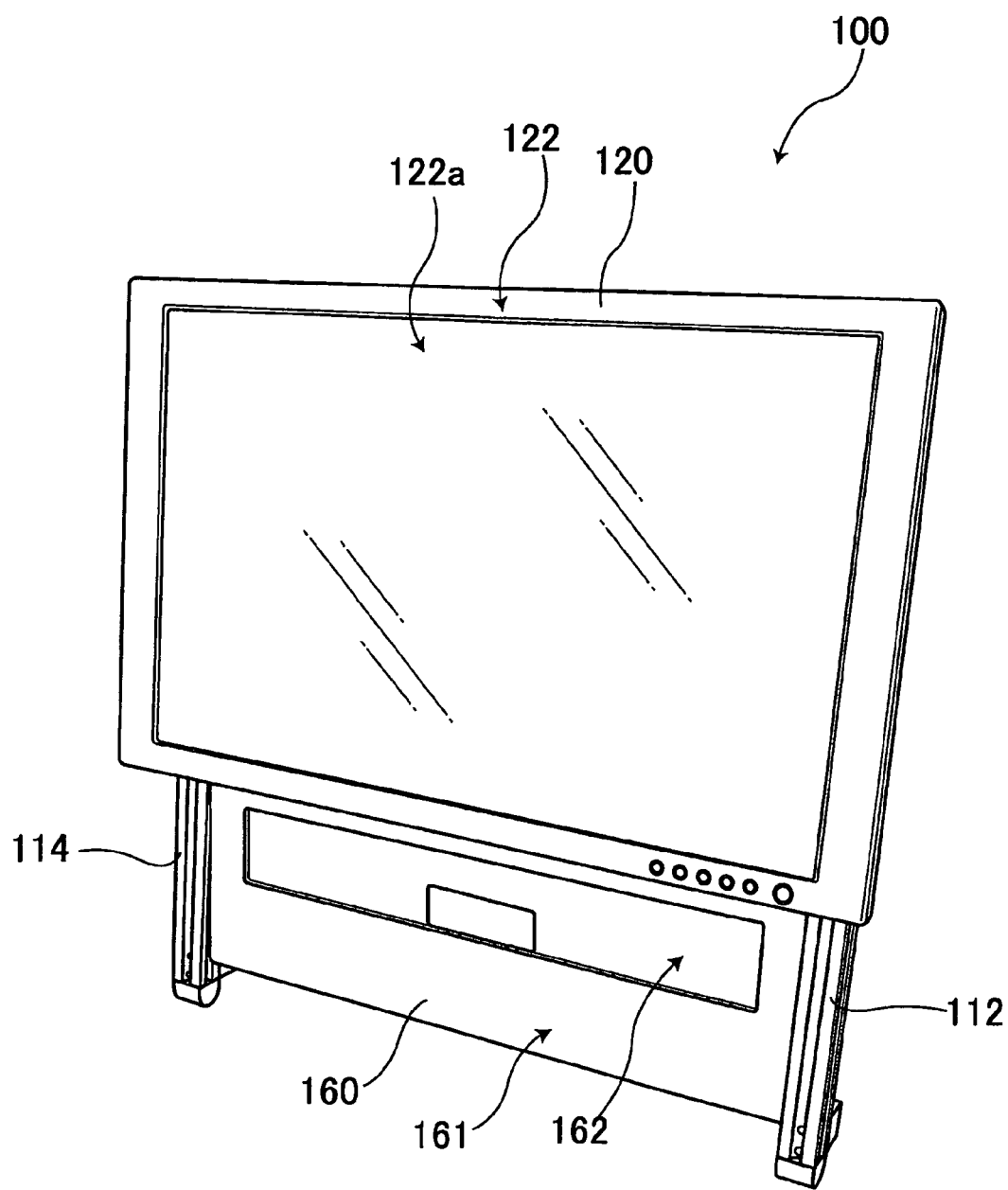
FIG. 14 is a front external perspective view of the desktop PC in a state in which the image display module is slid upward, laterally obliquely seen.
Figure 15:
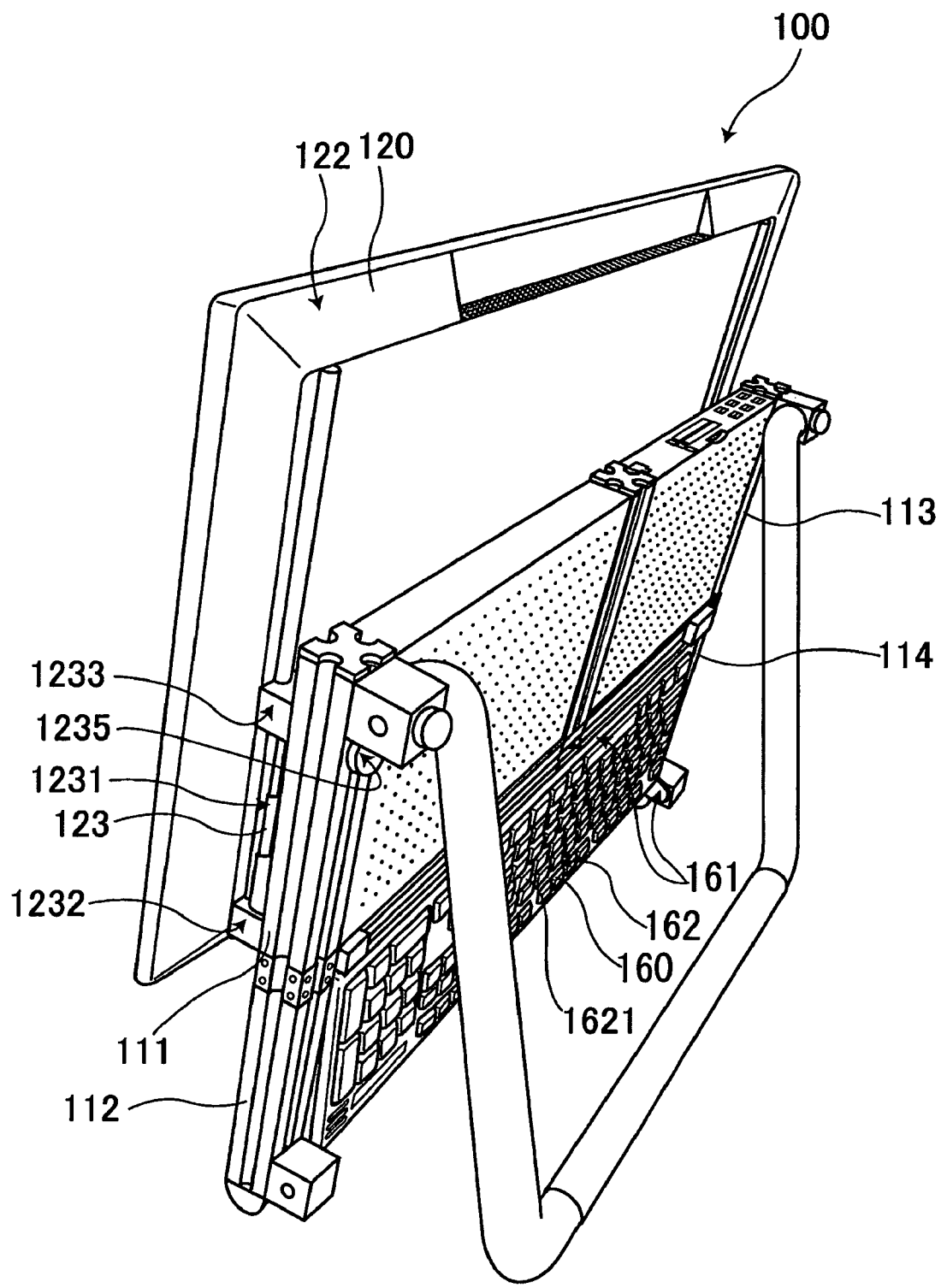
FIG. 15 is a rear external perspective view of the desktop PC in the state illustrated in FIG. 14, obliquely seen from above.
Figure 16:
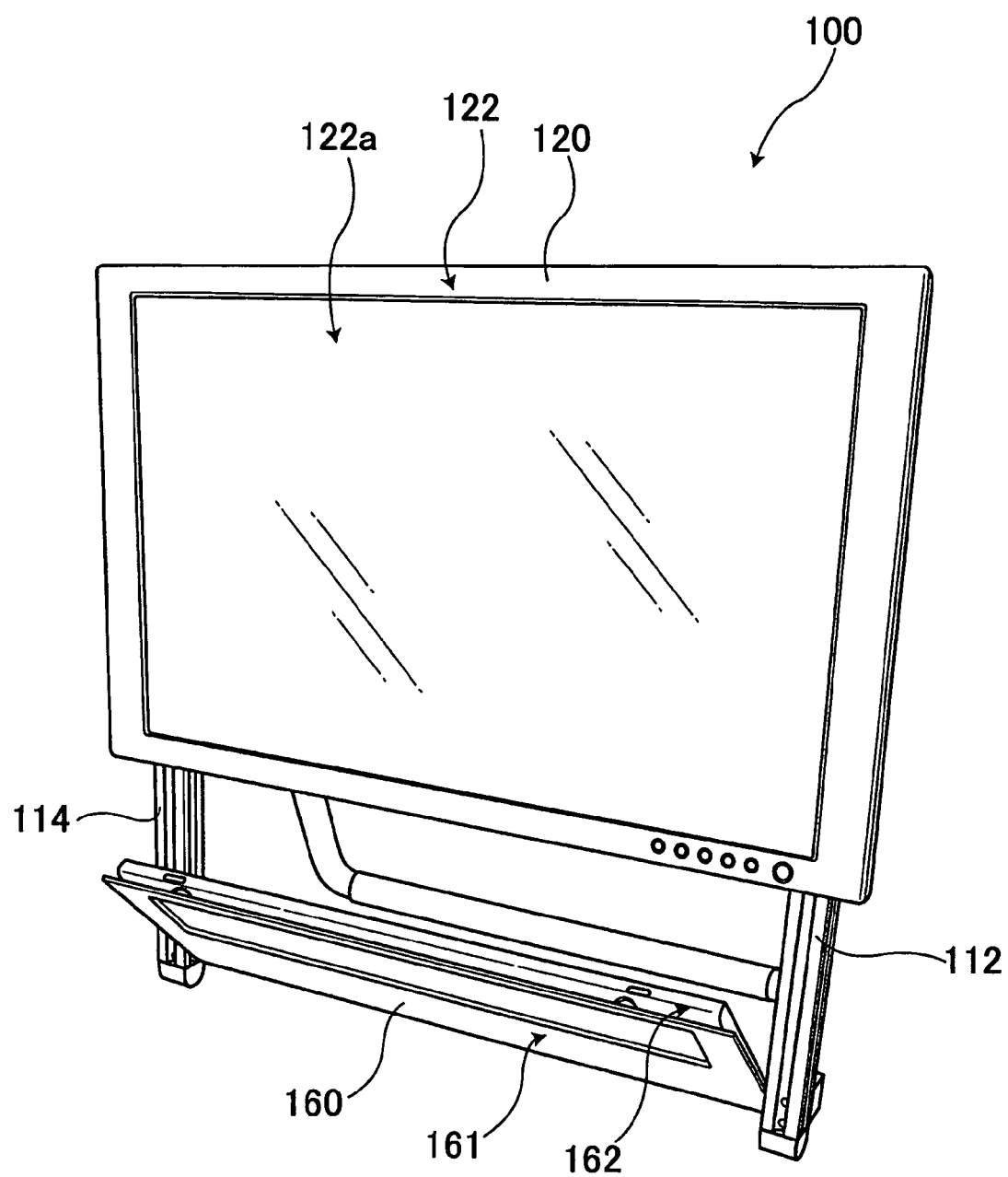
FIG. 16 is a front external perspective view of the desktop PC in a state of rotating the keyboard module, laterally obliquely seen.
Figure 17:
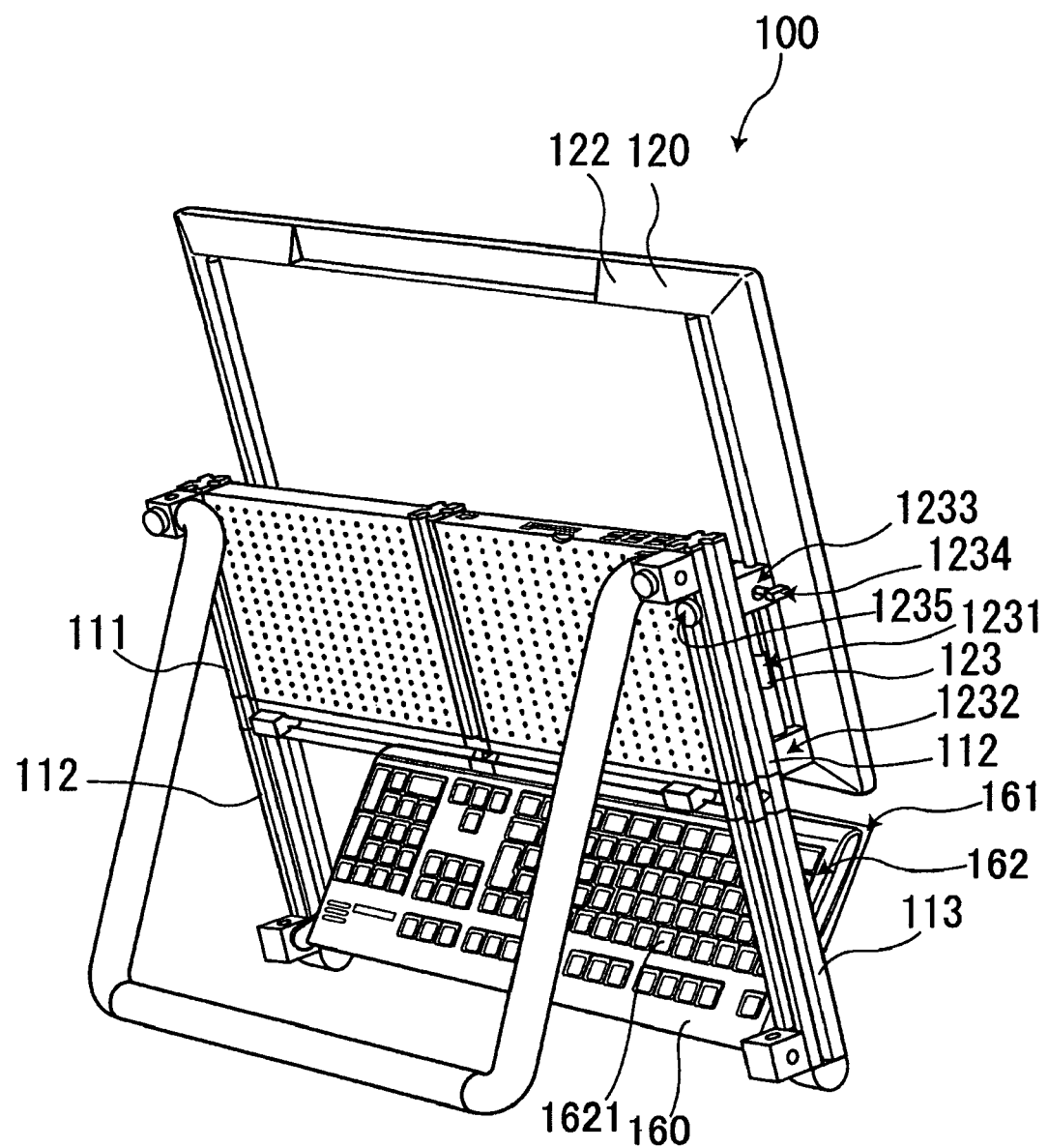
FIG. 17 is a rear external perspective view of the desktop PC in the state illustrated in FIG. 16, obliquely seen from above.
Figure 18:
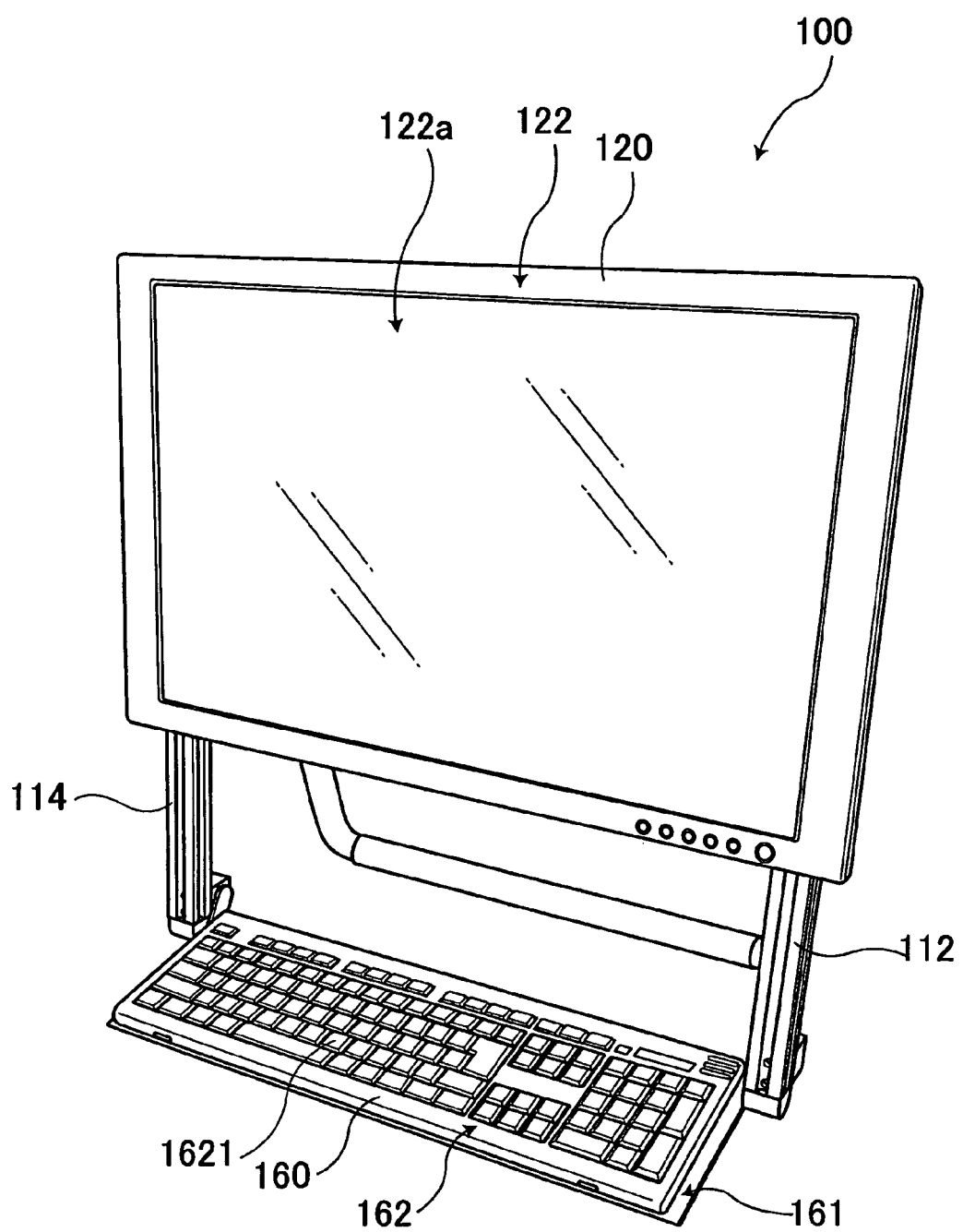
FIG. 18 is a front external perspective view of the desktop PC in the using state in which operational keys of the keyboard module are on a top surface, laterally obliquely seen.
Figure 19:
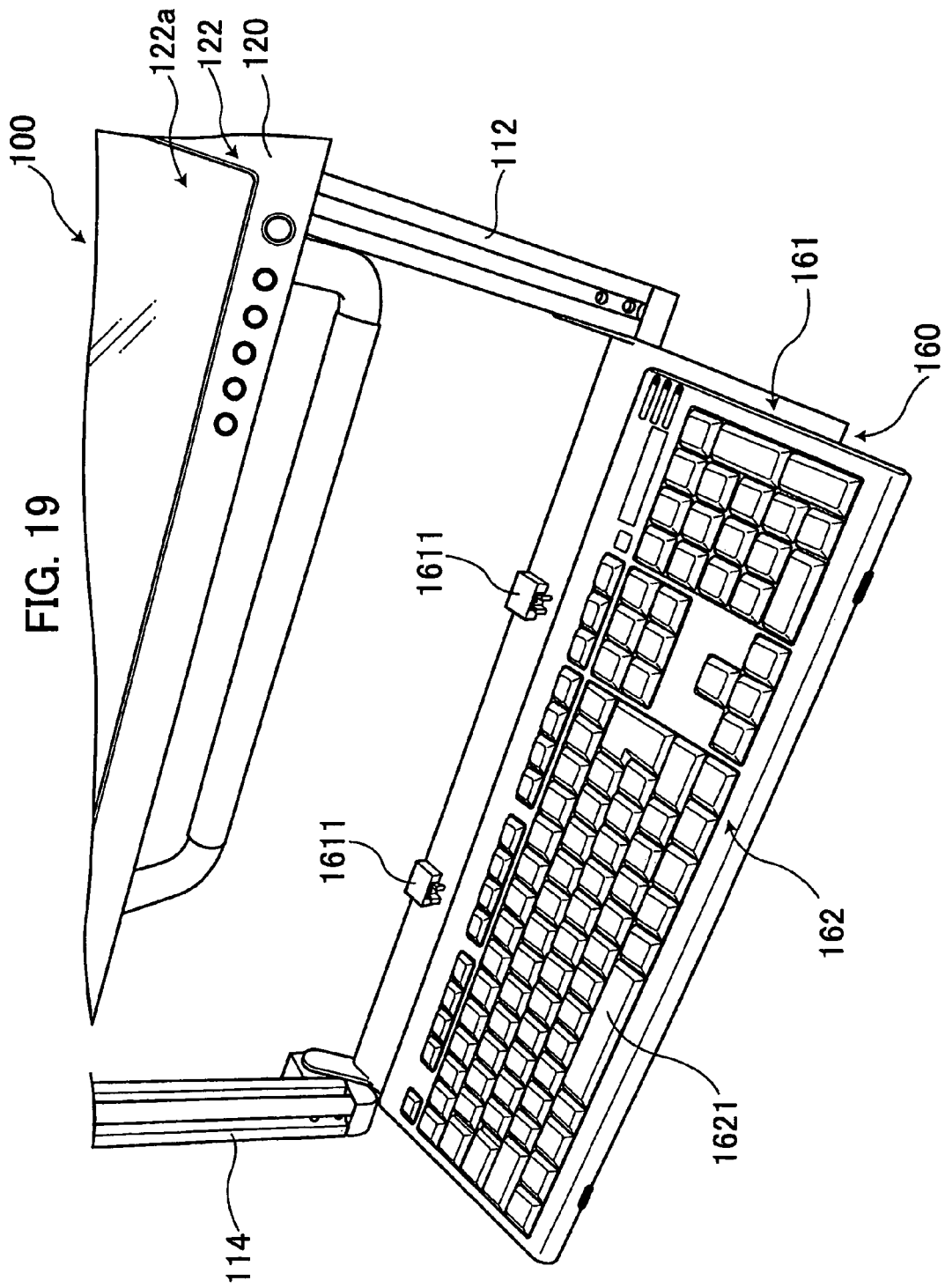
FIG. 19 is an external perspective view of the keyboard in which lock by a latch mechanism of the keyboard stage is released.
Figure 20:
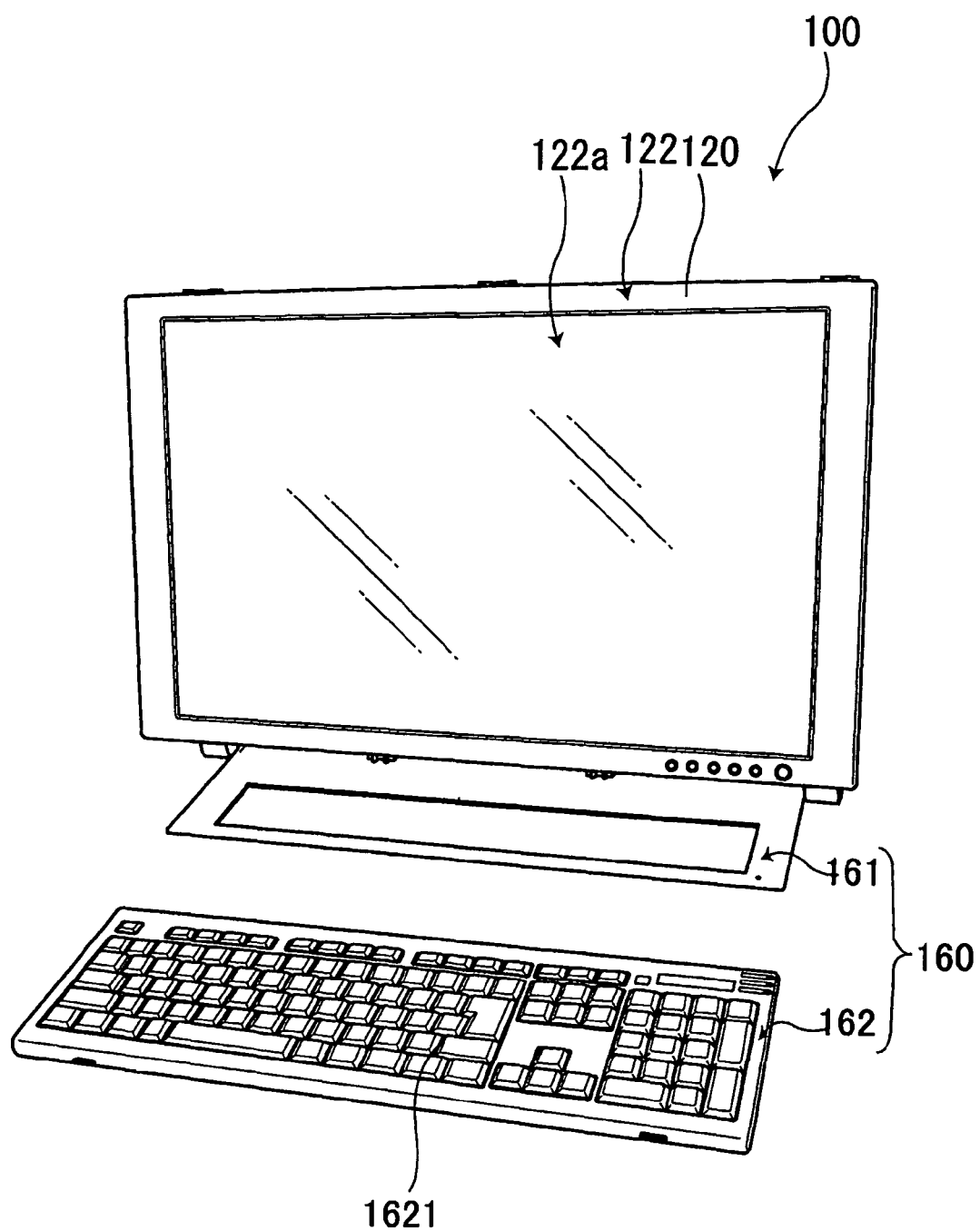
FIG. 20 is a front external perspective view of the desktop PC in a state in which the image display module is slid downward when the keyboard stage is in the using state, laterally obliquely seen.
Figure 21:
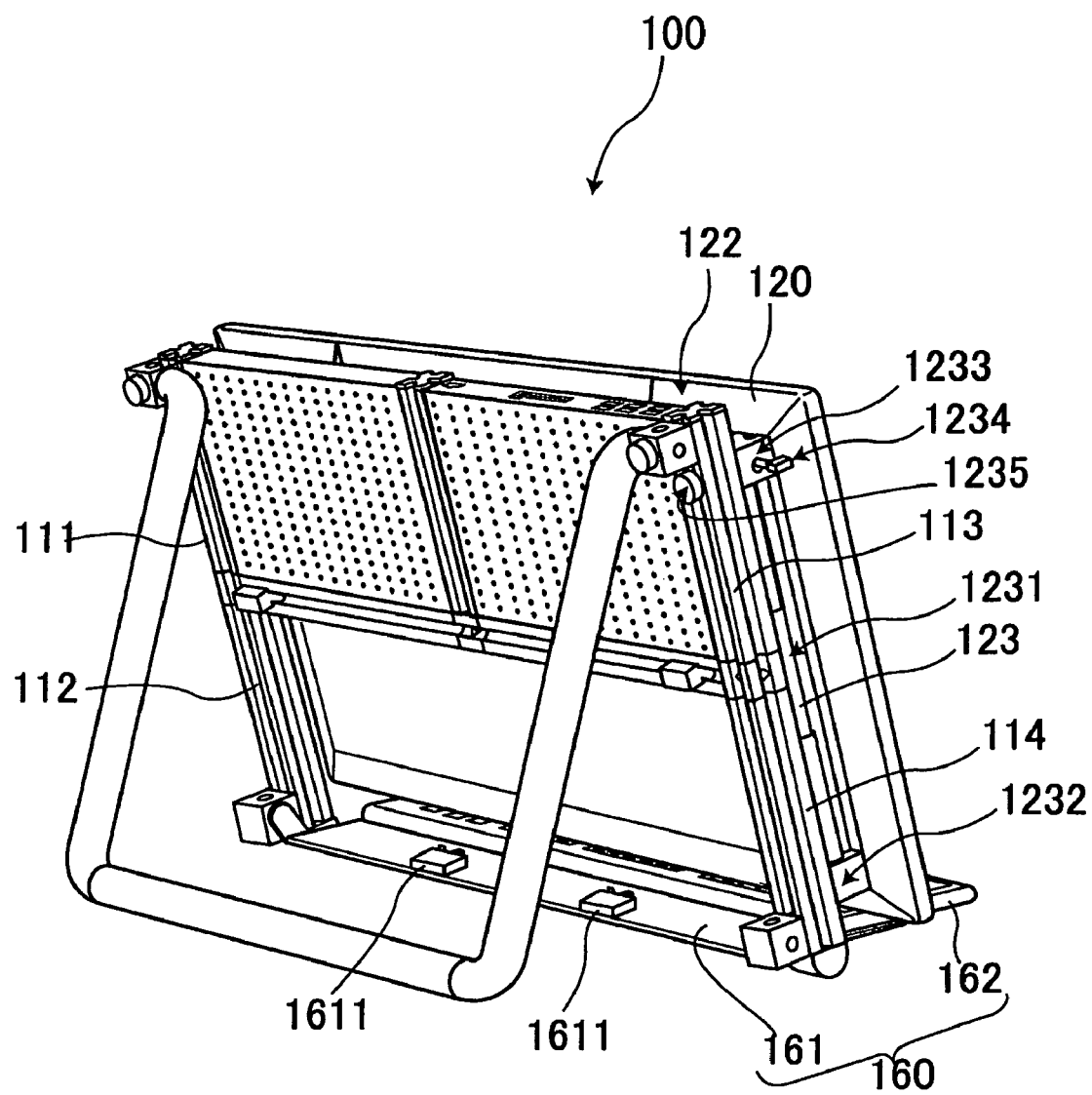
FIG. 21 is a rear external perspective view of the desktop PC in the state illustrated in FIG. 20, obliquely seen from above.
Figure 22:
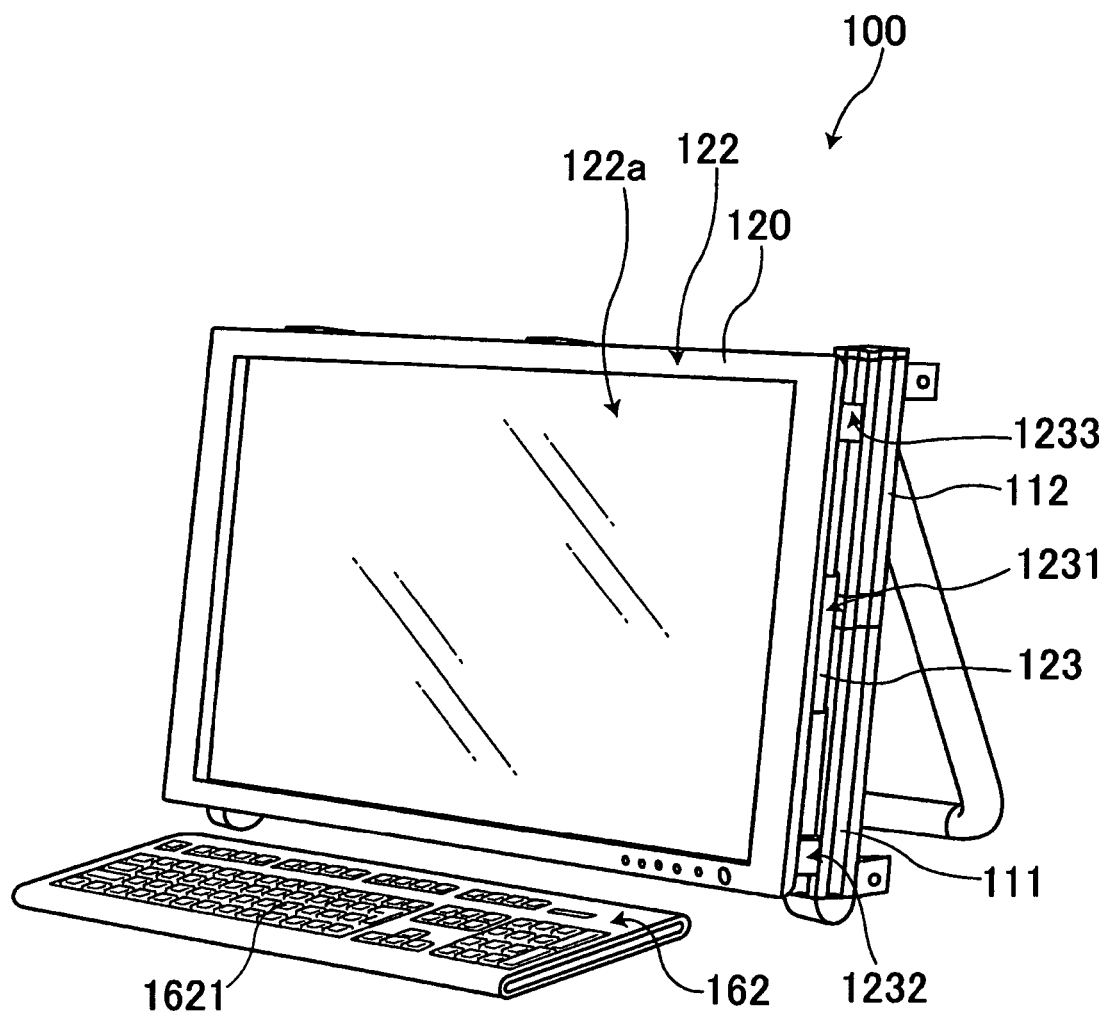
FIG. 22 is a front external perspective view of the desktop PC in a state in which the image display module is slid downward when the keyboard stage is in a stowed state, laterally obliquely seen.

FIG. 13 is an enlarged view of a keyboard stage 161 illustrated in FIGS. 2, 3, 5 and 6. Also, FIG. 14 is a front external perspective view of the desktop PC 100 in a state in which the image display module 120 is slid upward, laterally obliquely seen; and FIG. 15 is a rear external perspective view of the desktop PC 100 in the state illustrated in FIG. 14, obliquely seen from above. Also, FIG. 16 is a front external perspective view of the desktop PC 100 in a state of rotating the keyboard module 160, laterally obliquely seen; and FIG. 17 is a rear external perspective view of the desktop PC 100 in the state illustrated in FIG. 16, obliquely seen from above. FIG. 18 is a front external perspective view of the desktop PC 100 in the using state in which operational keys 1621 of the keyboard module 160 are on a top surface, laterally obliquely seen. FIG. 19 is an external perspective view of the keyboard 162 in which lock by a latch mechanism 1611 of the keyboard stage 161 is released. In addition, FIG. 20 is a front external perspective view of the desktop PC 100 in a state in which the image display module 120 is slid downward when the keyboard stage is in the using state, laterally obliquely seen; and FIG. 21 is a rear external perspective view of the desktop PC 100 in the state illustrated in FIG. 20, obliquely seen from above. Also, FIG. 22 is a front external perspective view of the desktop PC 100 in a state in which the image display module 120 is slid downward when the keyboard stage 161 is in a stowed state, laterally obliquely seen.

The desktop PC 100 is provided with the keyboard module 160 in which the operational keys 1621 are arranged as illustrated in FIGS. 2, 3, 5, 6 and 14 to 22.

The keyboard module 160 includes the keyboard stage 161 rotatably supported by a supporting member 180 formed of a pair of supporting pieces supported on lower sides of the pair of frames formed of the two coupled frames 111 and 112 and the two coupled frames 113 and 114; and the keyboard 162 detachably mounted on the keyboard stage 161.

Also, as illustrated in FIGS. 13 and 19, the keyboard stage 161 has the latch mechanism 1611, which is a locking mechanism for detachably locking the keyboard 162 mounted on the keyboard stage 161.

Therefore, in the using state, the user may select both using modes, which are the mode to use the keyboard 162 in a state of being mounted on the keyboard stage 161 and the mode to use the keyboard 162 in a state of being detached from the keyboard stage 161. Also, the latch mechanism 1611 may surely lock the keyboard 162 to the keyboard stage 161 and may release the lock more easily.

The supporting member 180 formed of the pair of supporting pieces supported on the lower sides of the pair of frames serves to rotatably support the keyboard module 160 between the using state and the stowed state illustrated in FIGS. 2, 3, 5 and 6 in which the keyboard module 160 is rotated in a direction to lift up a front side end edge thereof in the using state as illustrated in FIGS. 16 and 17 to be vertically arranged as illustrated in FIGS. 14 and 15, and then stowed on a rear side of the image display module 120 in a state of being slid downward, around a rotation axis extending between the pair of frames while passing in the vicinity of back side end edges in the using state illustrated in FIG. 18 in which the operational keys 1621 lying upward.

Also, the keyboard module 160 is rotated by passing through a space defined with the lower end of the image display module 120 and the pair of frames between the stowed state and the using state, in a state in which the image display module 120 is slid upward.

In this manner, when sliding the image display module 120 downward after rotating the keyboard module 160 from the using state to the stowed state, the keyboard module 160 is stowed on the rear side of the image display module 120. Therefore, the display screen 122a is exposed even in the stowed state in which the keyboard module 160 is stowed. Therefore, for example, if the desktop PC 100 of this embodiment is the desktop PC having a mode without need of the keyboard 162, a negative effect to aesthetic appearance due to the keyboard 162 that is not used in this mode, hanging forward is solved, when the desktop PC 100 is used in the mode without need of the keyboard 162.

Figure 23:
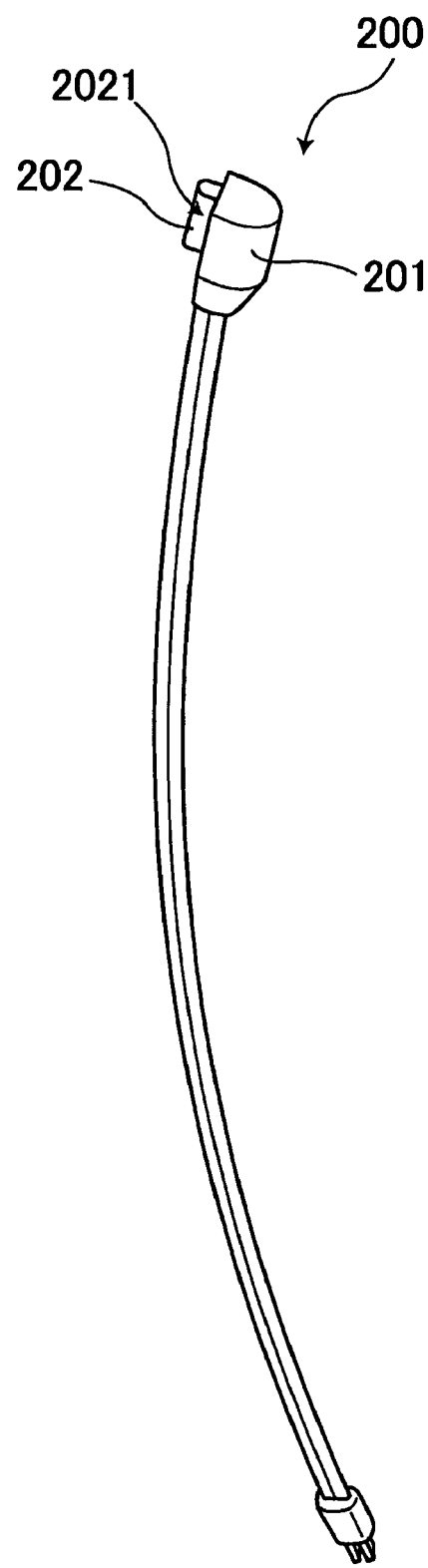
FIG. 23 is an external perspective view of an AC adapter 200.
Figure 24:
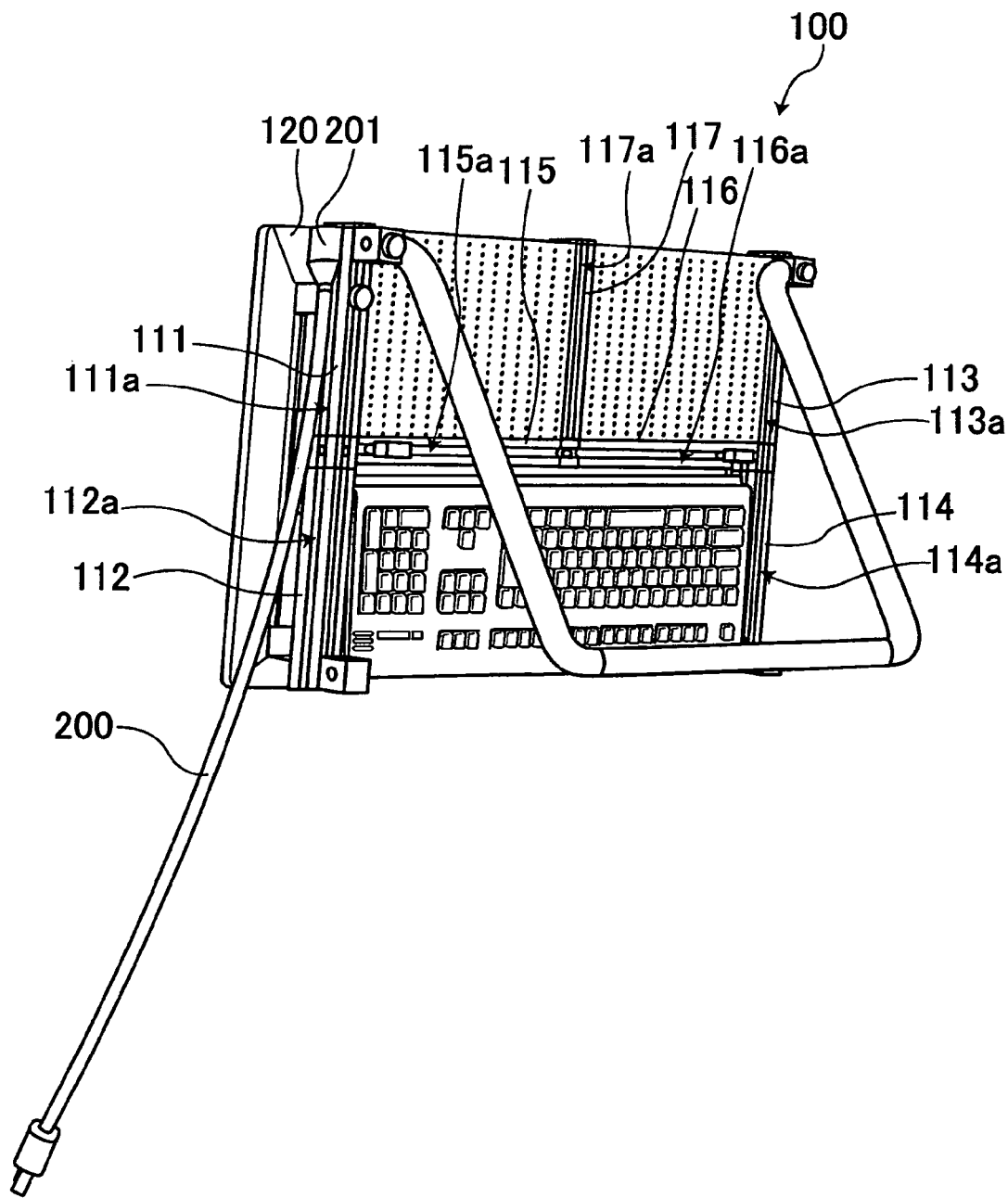
FIG. 24 is a rear external perspective view of the desktop PC to which the AC adapter illustrated in FIG. 23 is connected, laterally obliquely seen.

FIG. 23 is an external perspective view of an AC adapter 200; and FIG. 24 is a rear external perspective view of the desktop PC 100 to which the AC adapter 200 illustrated in FIG. 23 is connected, laterally obliquely seen.

The AC adapter 200 illustrated in FIGS. 23 and 24 has a power converting section 201 for converting AC power to DC power to be supplied to the image display module 120, the main unit module 130, the connector module 140 and the keyboard module 160; and an adapter side power terminal 2021 contacting the frame side power terminal 1111 for supplying the DC power obtained by the power converting section 201 to the frame side power terminal 1111; and is provided with a power supplying section 202 supported on any of plural or consecutive positions of the frames 111, 112, 113, 114, 115, 116 and 117. The power supplying section 202 has a convex stripe shape, which detachably fits in the grooves 111a, 112a, 113a, 114a, 115a, 116a and 117a formed on the frames 111, 112, 113, 114, 115, 116 and 117, respectively.

By connecting the AC adapter 200 to the AC power, the DC power is stably supplied to the image display module 120, the main unit module 130, the connector module 140 and the keyboard module 160. Also, the power supplying section 202 is supported on any of the plural or consecutive positions of the frames 111, 112, 113, 114, 115, 116 and 117, so that a degree of freedom in installing the AC adapter 200 is high.

Figure 25:
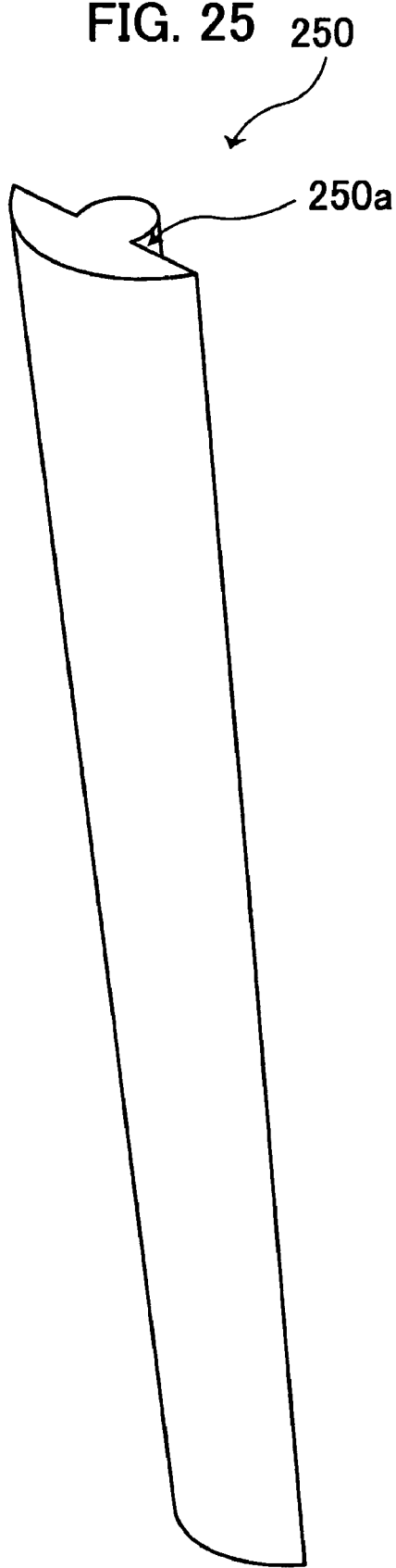
FIG. 25 is an external perspective view of a protecting member.
Figure 26:
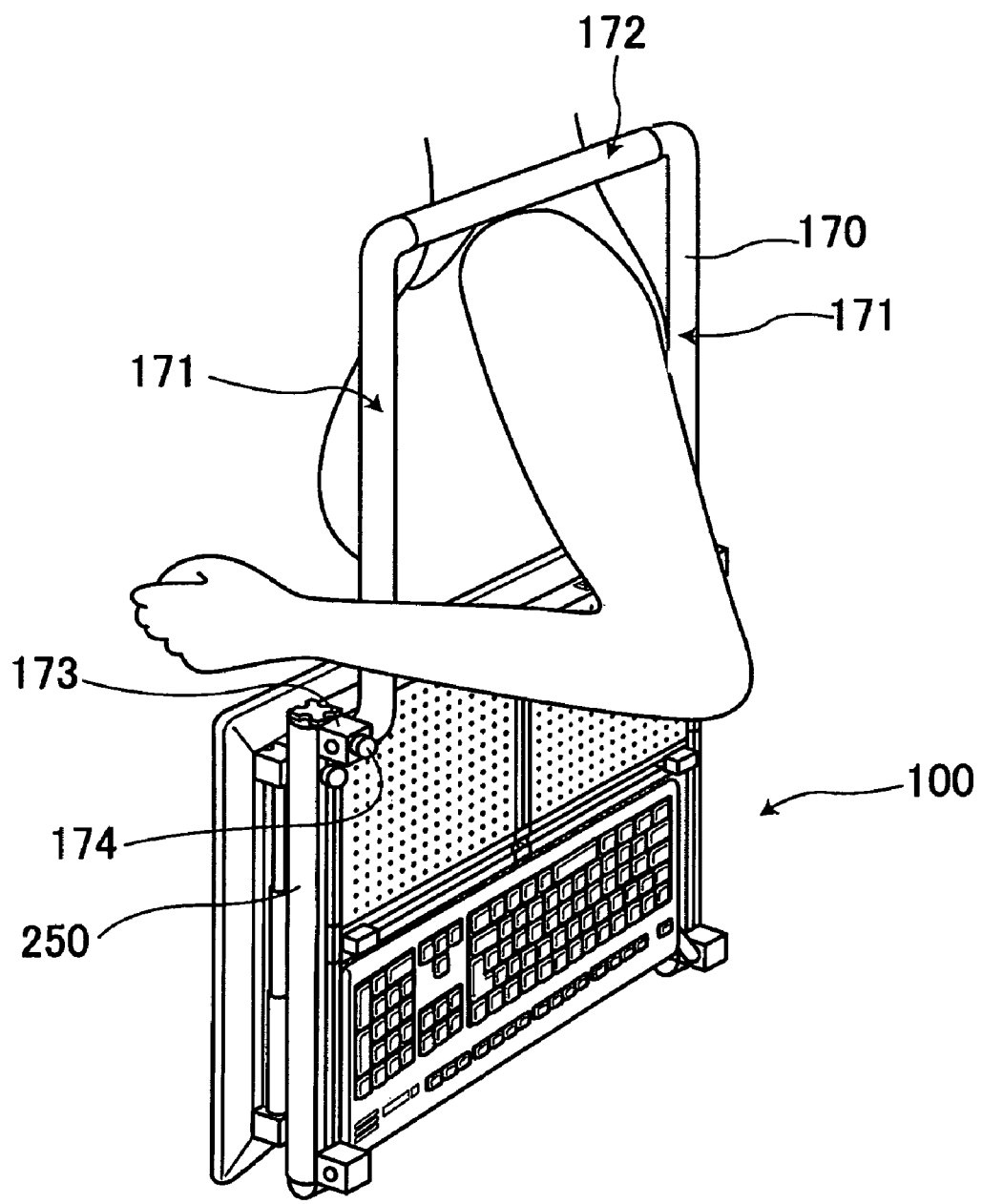
FIG. 26 is a rear external perspective view of the desktop PC further provided with the protecting member illustrated in FIG. 25, obliquely seen from above.

FIG. 25 is an external perspective view of a protecting member 250; and FIG. 26 is a rear external perspective view of the desktop PC 100 further provided with the protecting member 250 illustrated in FIG. 25, obliquely seen from above.

The protecting member 250 illustrated in FIG. 25 is formed of the elastic material having a convex stripe 250a, which detachably fits in the grooves 111a, 112a, 113a, 114a, 115a, 116a and 117a formed on the frames 111, 112, 113, 114, 115, 116 and 117, respectively. Also, the protecting member 250 serves to cover the frame side power terminal 1111 (refer to FIG. 7) and the frame side signal terminal 1112 (refer to FIG. 7) as illustrated in FIG. 26.

Therefore, the frame side power terminal 1111 and the frame side signal terminal 1112 are protected from dust and humidity, and electrification and short circuit are prevented from occurring. Also, the user is prevented from being injured by touching the frames 111, 112, 113, 114, 115, 116 and 117. Further, since a shock to the frames 111, 112, 113, 114, 115, 116 and 117 is moderated, damage of the frames 111, 112, 113, 114, 115, 116 and 117 and the frame side power terminal 1111 and the frame side signal terminal 1112 provided on the frames 111, 112, 113, 114, 115, 116 and 117 is prevented.

Figure 27:
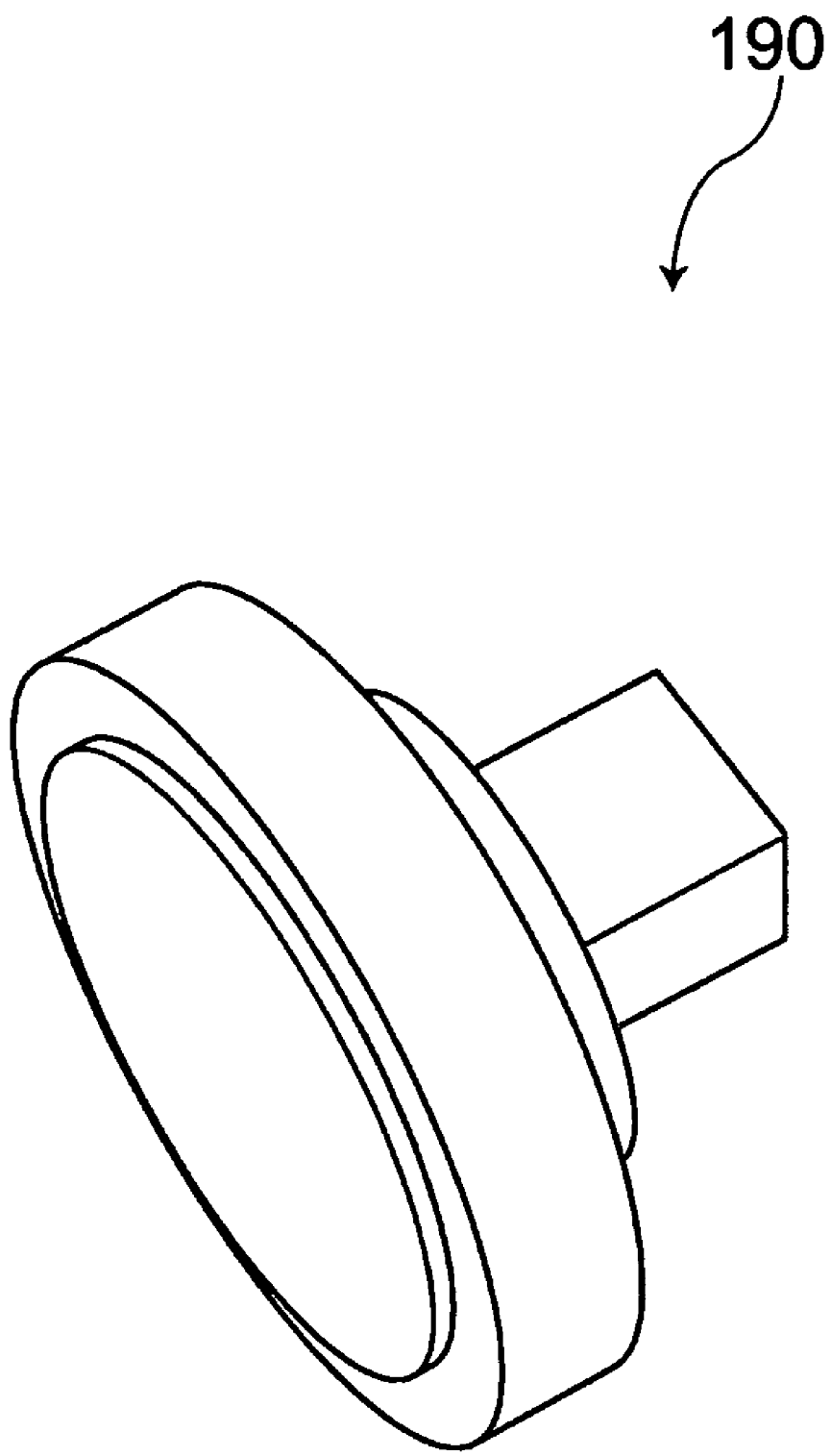
FIG. 27 is an external perspective view of a wheel.
Figure 28:
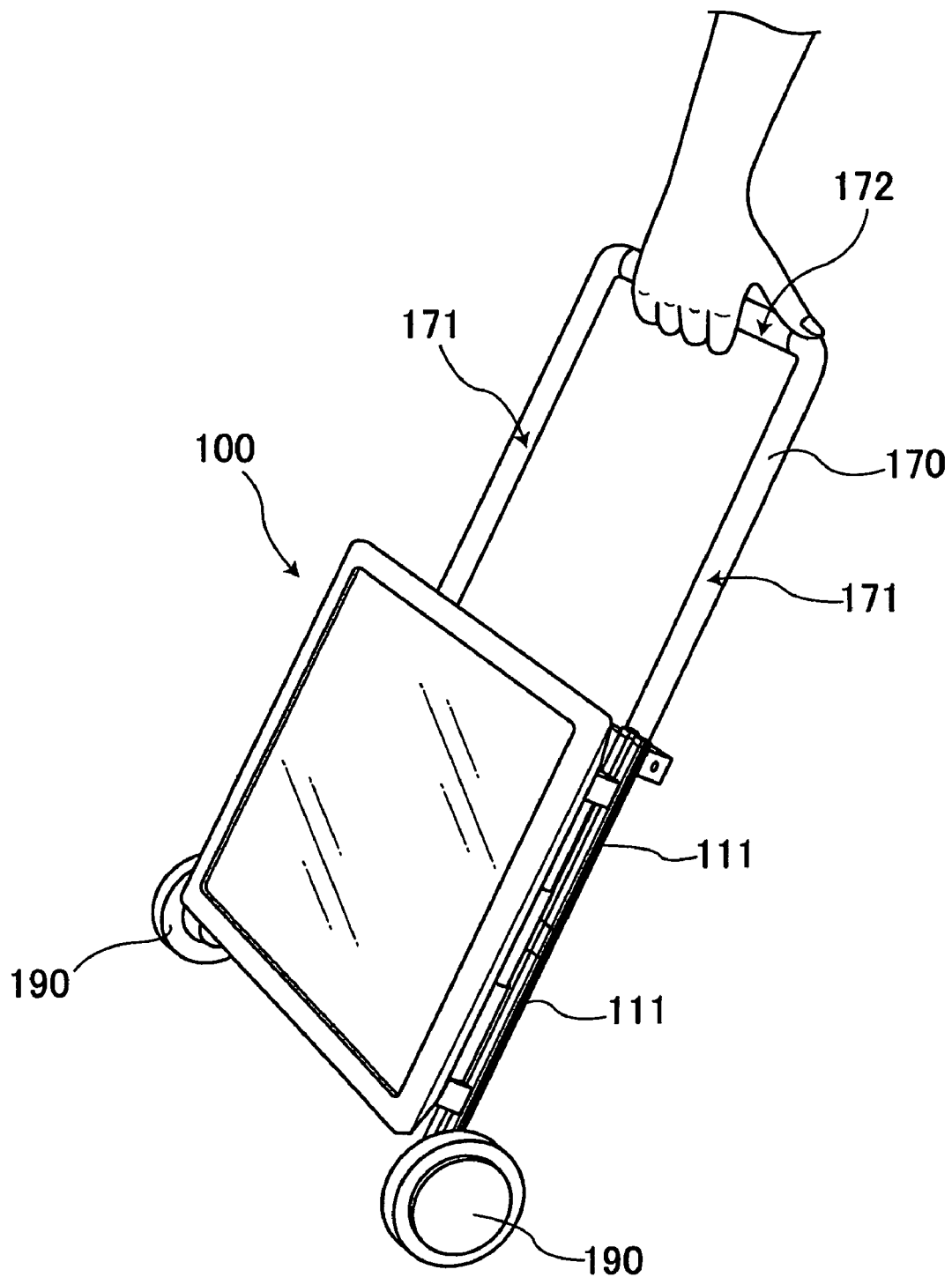
FIG. 28 is an external perspective view of the desktop PC further provided with the wheel illustrated in FIG. 27.

FIG. 27 is an external perspective view of a wheel 190; and FIG. 28 is an external perspective view of the desktop PC 100 further provided with the wheel 190 illustrated in FIG. 27.

The wheel 190 illustrated in FIG. 27 is attached to the lower ends of the pair of frames formed of the two coupled frames 111 and 112 and the two coupled frames 113 and 114.

The wheels 190 reduce the load of the user when carrying the desktop PC 100.

Figure 29:
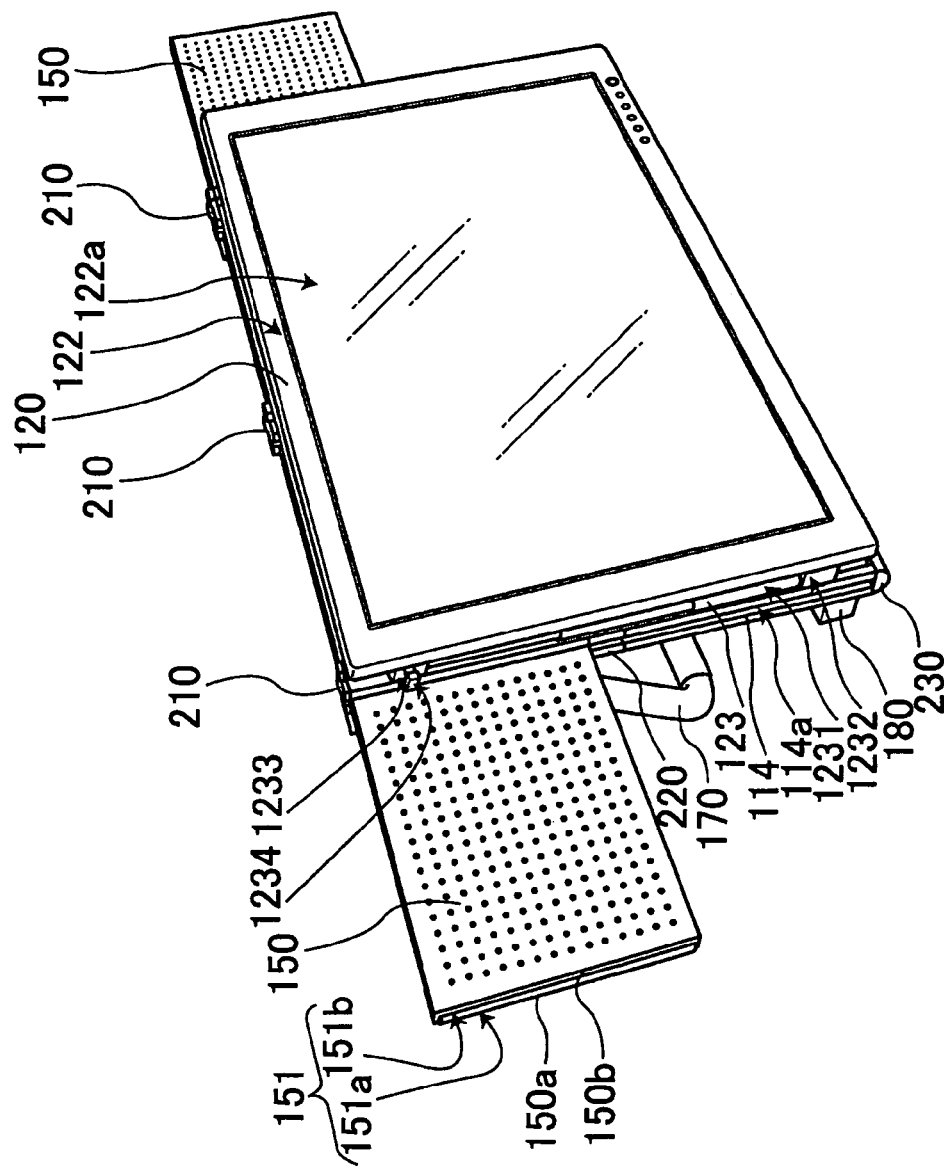
FIG. 29 is a front external perspective view of the desktop PC on which a speaker module is further mounted, laterally obliquely seen.
Figure 30:
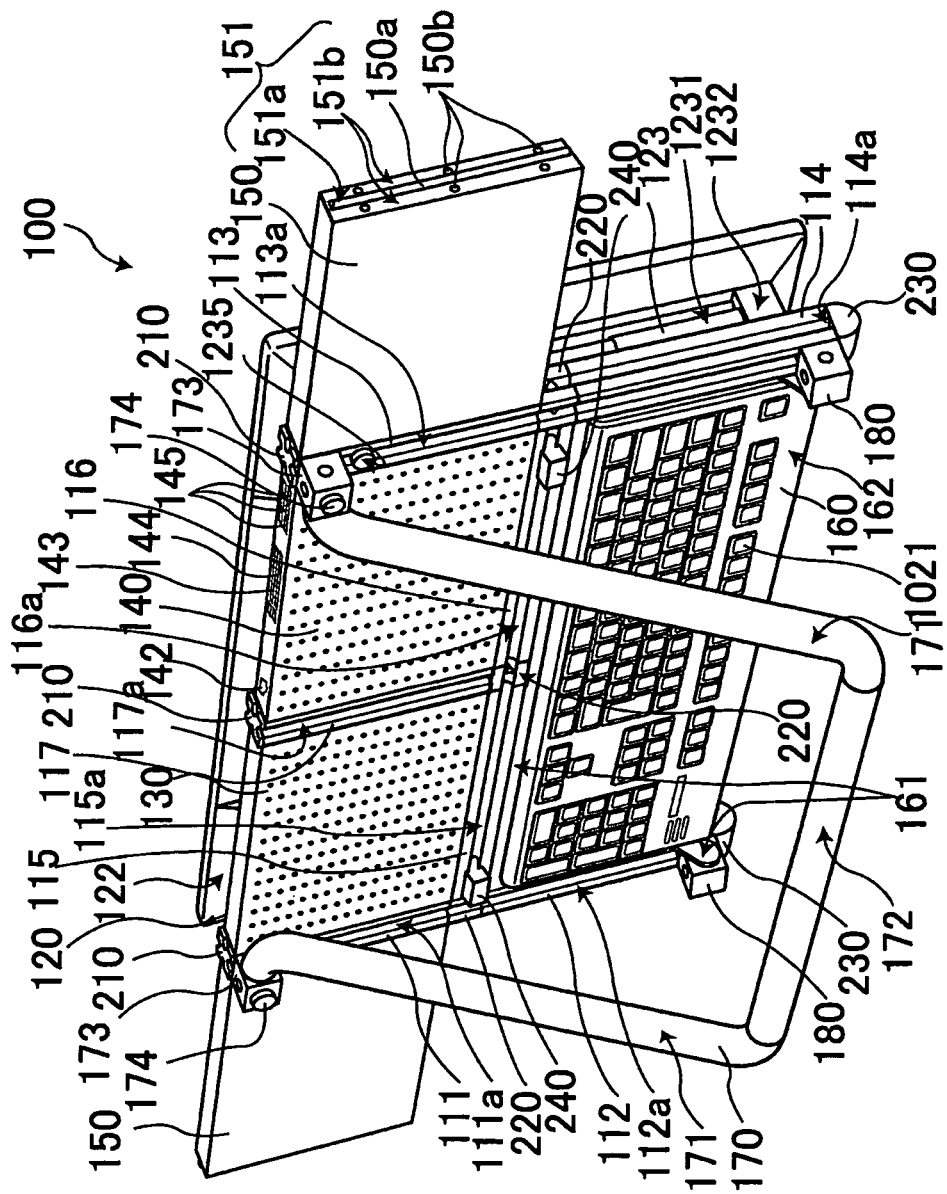
FIG. 30 is a rear external perspective view of the desktop PC illustrated in FIG. 29, laterally obliquely seen.

FIG. 29 is a front external perspective view of the desktop PC 100 on which a speaker module 150 is further mounted, laterally obliquely seen; and FIG. 30 is a rear external perspective view of the desktop PC 100 illustrated in FIG. 29, laterally obliquely seen.

The speaker module 150 is provided with a speaker, and has a frame receiving section 151 detachably supported so as to be slidable up and down by the pair of frames formed of the two coupled frames 111 and 112 and the two coupled frames 113 and 114 out of the seven frames 111, 112, 113, 114, 115, 116 and 117.

Also, the speaker module 150 has protrusions 151a, which slidably and detachably fit in the grooves 111a, 112a, 113a and 114a of the frames 111, 112, 113 and 114, respectively, on both right and left side surfaces of the speaker module 150, and wall surfaces 151b on both sides of the protrusion 151a have shapes to abut the wall surfaces on both sides of the grooves 111a, 112a, 113a and 114a of the frames 111, 112, 113 and 114, respectively. A combination of the protrusion 151a and the wall surfaces 151b is the frame receiving section 151 of the speaker module 150. Also, the main unit module side power terminal 150a to be supplied with the power from the frames 111, 112, 113 and 114 is provided on the protrusion 151a of the frame receiving section 151. Also, the main unit module side signal terminal 150b for transmitting the signal between the speaker module 150 and the outside is provided on the wall surface 151b of the frame receiving section 151.

Figure 31:
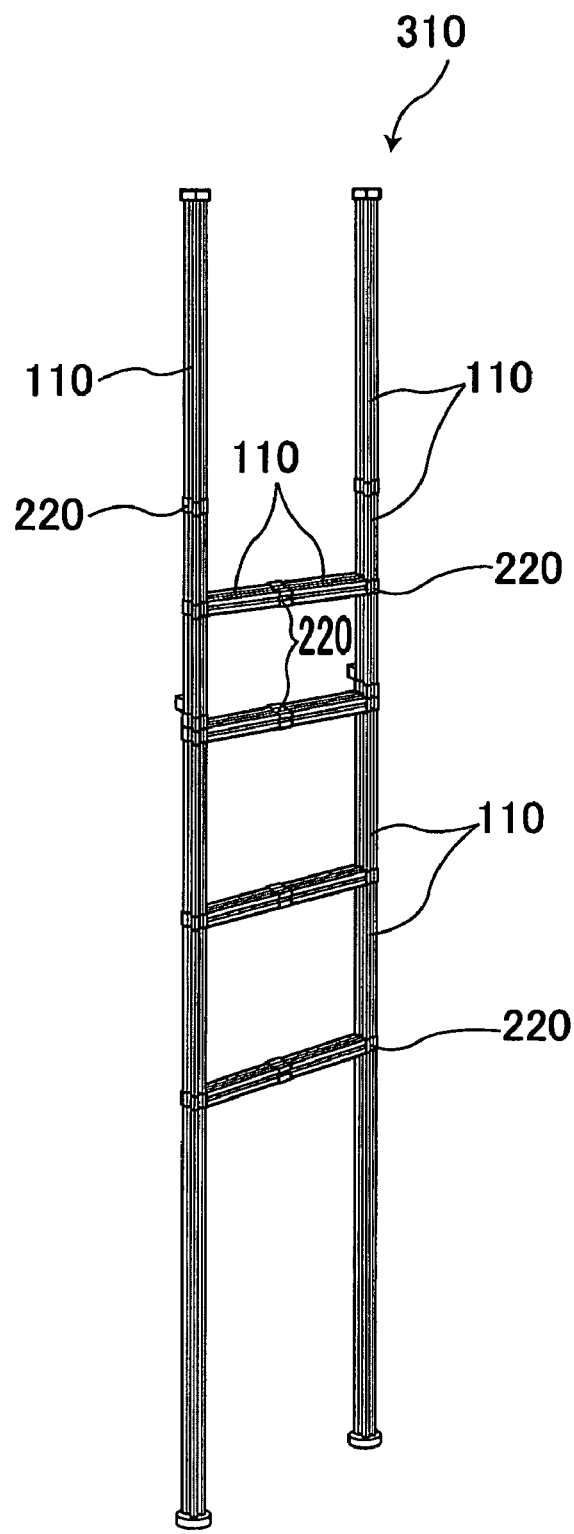
FIG. 31 is a front external perspective view of the frame of another mode, laterally obliquely seen.
Figure 32:
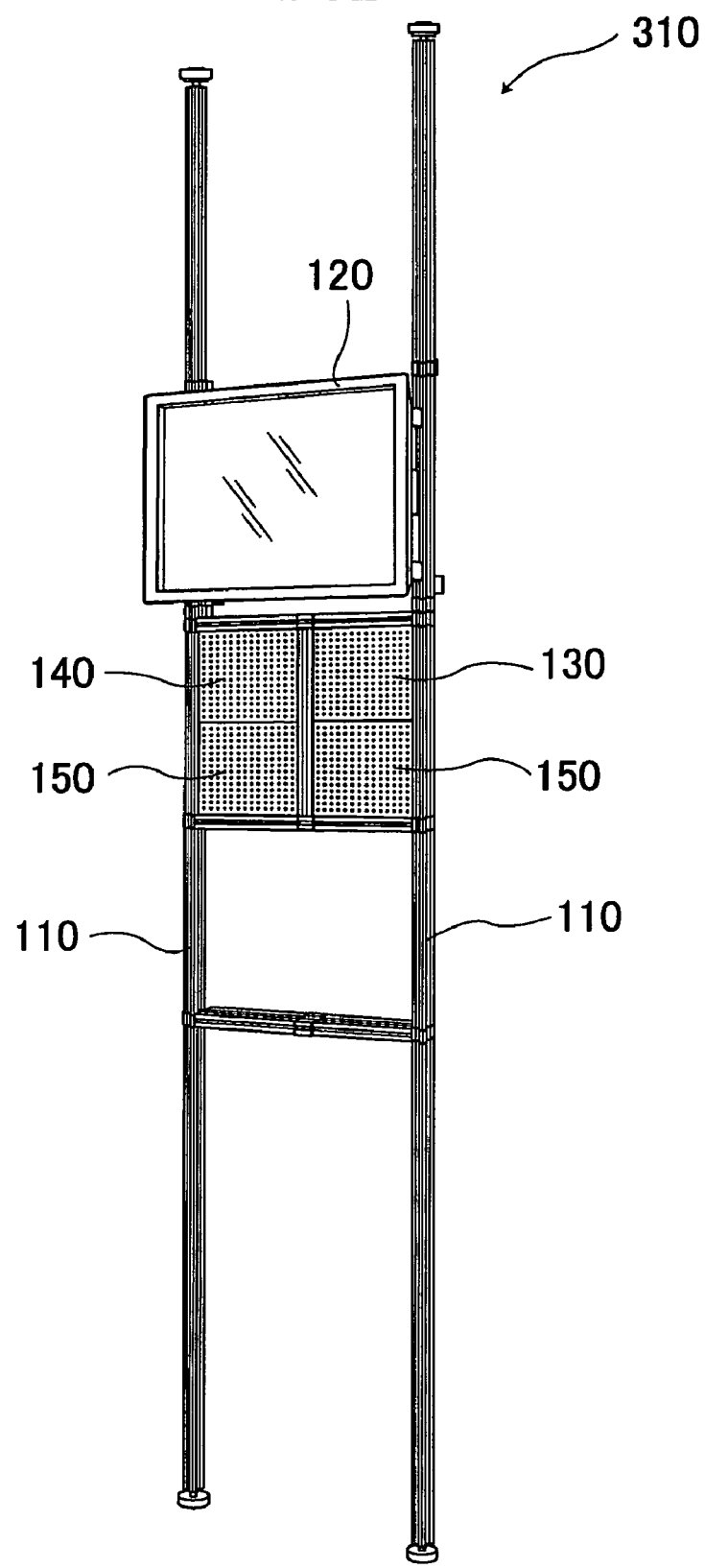
FIGS. 32 to 34 are front external perspective views of the mode using the frame illustrated in FIG. 31, laterally obliquely seen.
Figure 33:
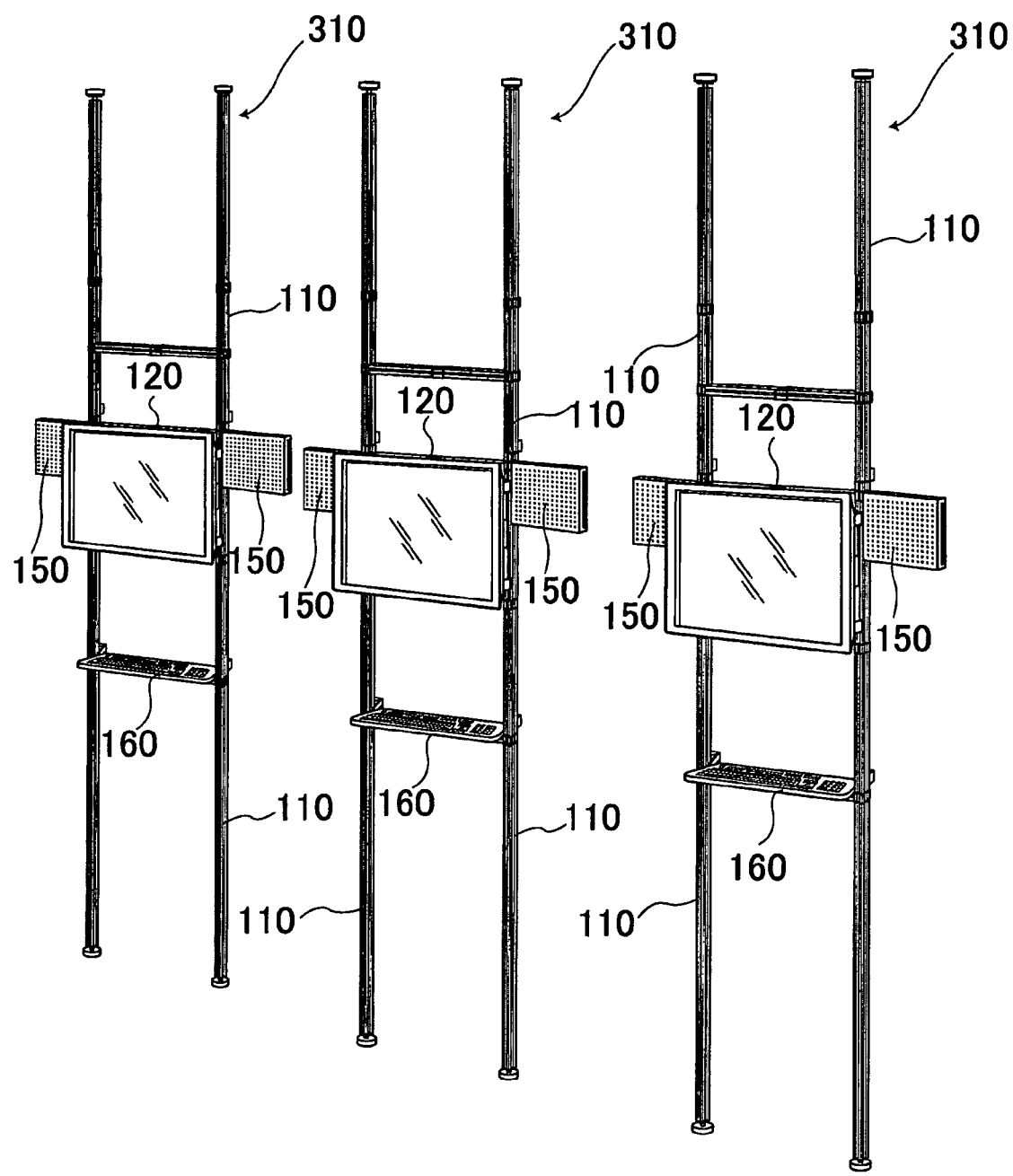
Figure 34:
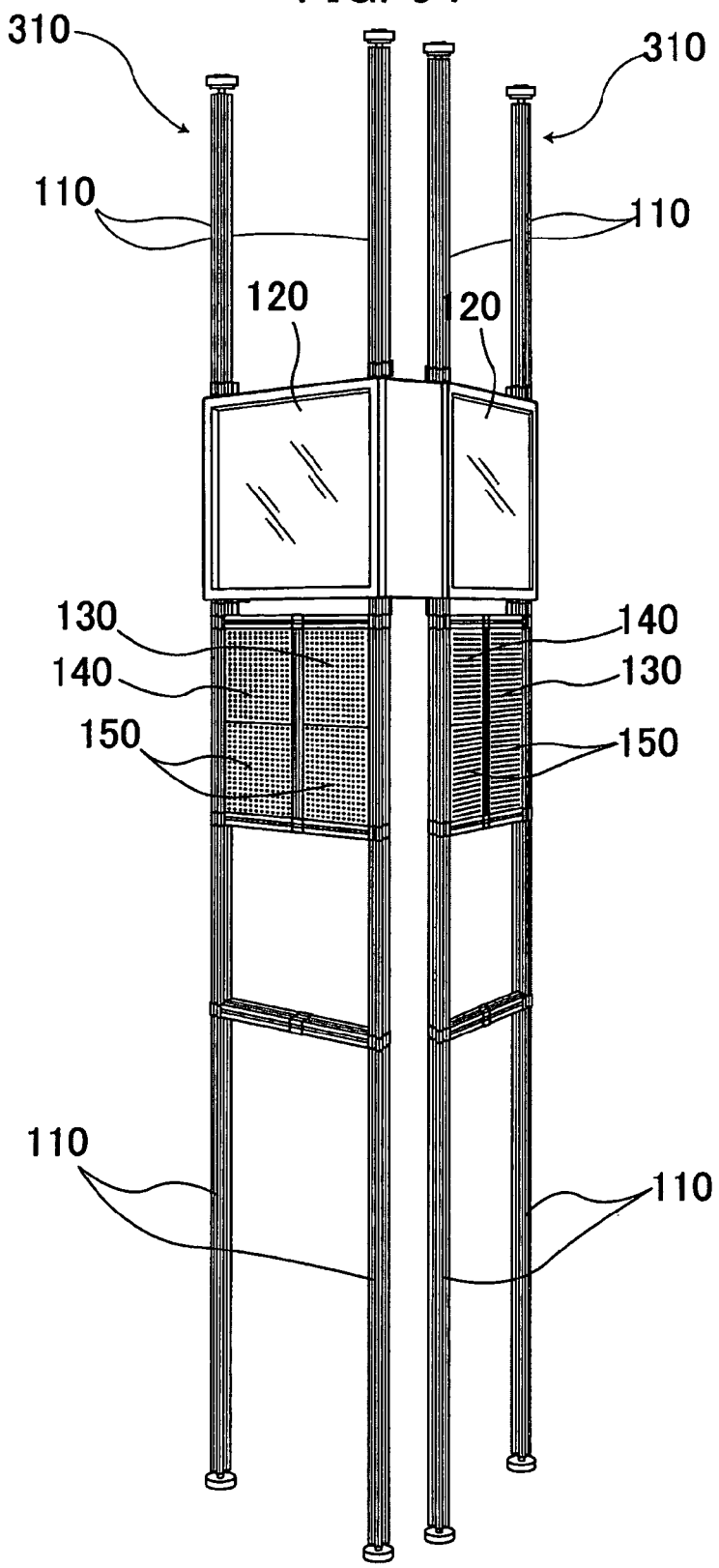

FIG. 31 is a front external perspective view of the frame 110 of another mode, laterally obliquely seen; and FIGS. 32 to 34 are front external perspective views of the mode using the frame illustrated in FIG. 31, laterally obliquely seen.

A frame 310 illustrated in FIG. 31 is obtained by coupling the frames 110 by using the joint parts 220. The frame 110 has a cross section identical to that of the seven frames 111, 112, 113, 114, 115, 116 and 117 and has a bar shape, and the frame 310 serves to support various modules such as the image display module 120, the main unit module 130, the connector module 140, the speaker module 150 and the keyboard module 160.

It is possible to use a mode in which the frame 310 illustrated in FIG. 31 serves to support the image display module 120, the main unit module 130, the connector module 140 and the speaker module 150 as illustrated in FIG. 32; a mode in which three frames 310 illustrated in FIG. 31 are arranged in parallel serving to support the image display module 120, the speaker module 150 and the keyboard module 160 as illustrated in FIG. 33; and a mode in which two frames 310 illustrated in FIG. 31 are closely arranged to each other serving to support the image display module 120, the main unit module 130, the connector module 140 and the speaker module 150 as illustrated in FIG. 34.

Figure 35:
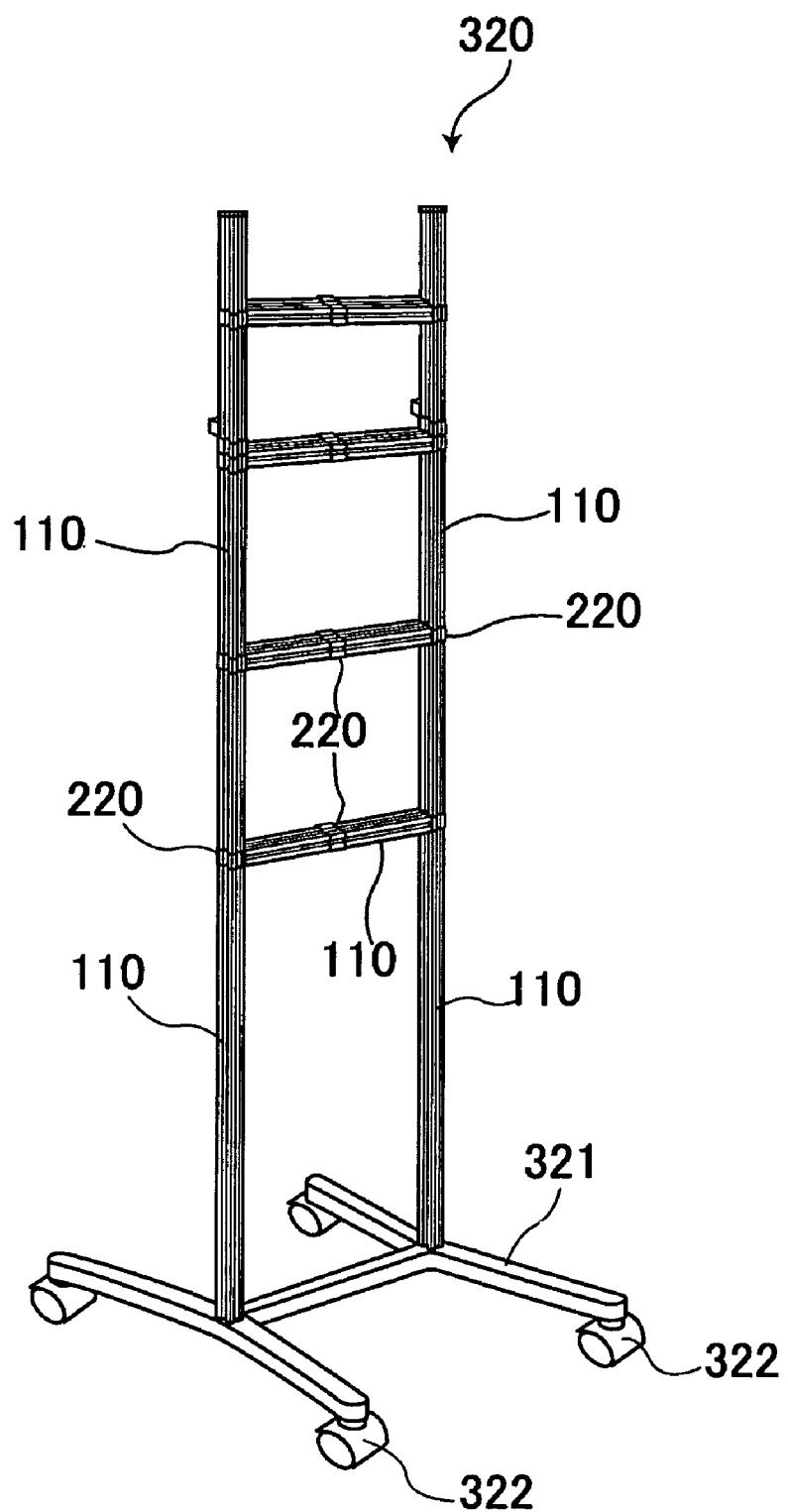
FIG. 35 is a front external perspective view of the frame of yet another mode, laterally obliquely seen.
Figure 36:
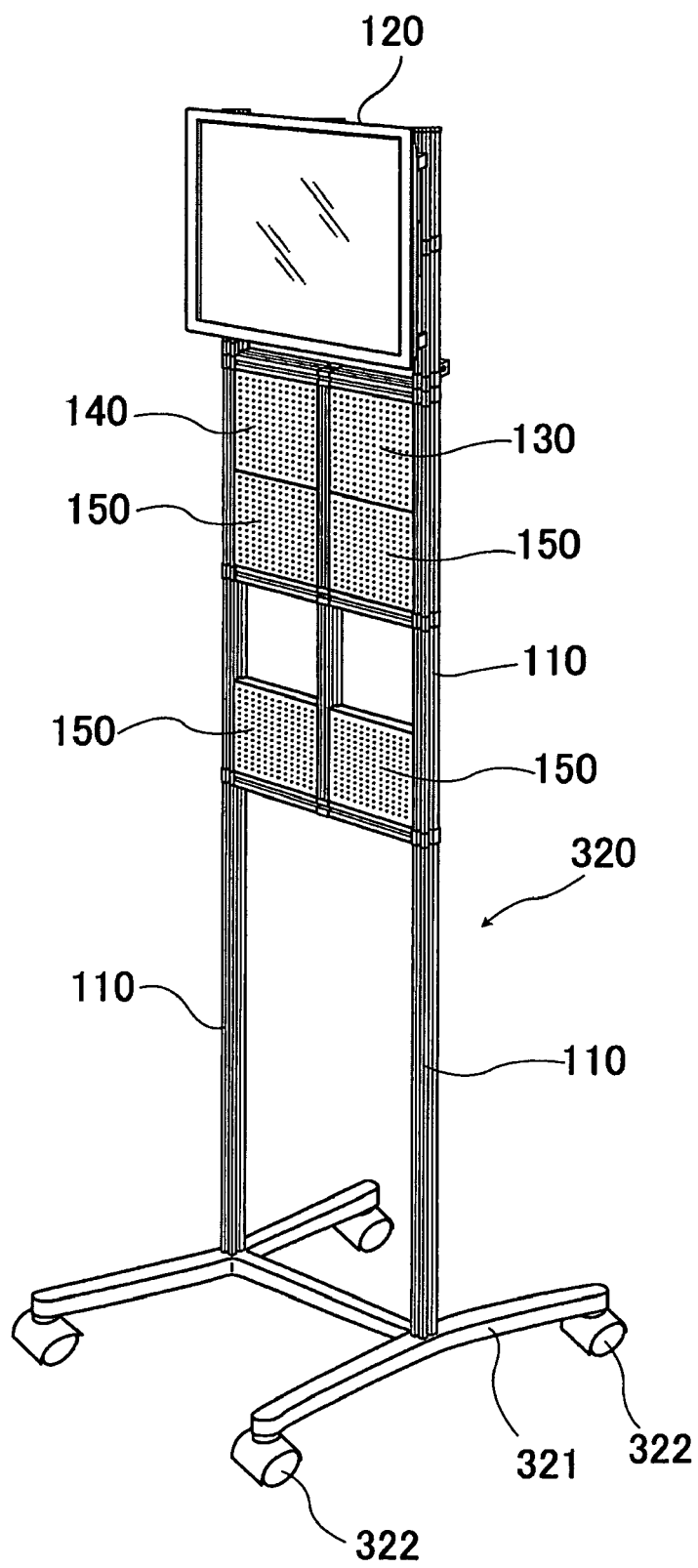
FIG. 36 is a front external perspective view of the mode using the frame illustrated in FIG. 35, laterally obliquely seen.

FIG. 35 is a front external perspective view of the frame of yet another mode, laterally obliquely seen; and FIG. 36 is a front external perspective view of the mode using the frame illustrated in FIG. 35, laterally obliquely seen.

A frame 320 illustrated in FIG. 35 is obtained by coupling the frames 110 by using the joint parts 220 as in the case of the frame 310 illustrated in FIG. 31, and is further provided with a frame supporting section 321 and a caster 322 on a lower end thereof. The frame 320 also serves to support various modules such as the image display module 120, the main unit module 130, the connector module 140, the speaker module 150 and the keyboard module 160.

As illustrated in FIG. 36, it is possible to use a mode in which the frame 310 illustrated in FIG. 31 serves to support the image display module 120, the main unit module 130, the connector module 140 and the speaker module 150.

Meanwhile, although the desktop PC as one example of the electronic device is described in the embodiments, the invention is not limited to this.

Further, although the image display module, the main unit module and the connector module are mentioned as examples of the modules in the embodiments, the invention is not limited to this, and a bay module to store the hard disk and various drives may be used, for example.

Moreover, although the example in which the power supply and the signal transmittance are performed by the different terminals is described in the embodiments, the invention is not limited to this, and the power supply and the signal transmittance may be performed by a same terminal by employing so-called power line communication (PLC) for transmitting the signal by using a power line, for example.

Still further, although the example of sliding the image display module up and down by using the extendable pole, which is the up-and-down damper, is described in the embodiments, the invention is not limited to this, and any mechanism may be used as long as the mechanism may slide the image display module up and down.

In addition, although the example of latch mechanism that detachably locks the keyboard mounted on the keyboard stage is described in the embodiments, the invention is not limited to the latch mechanism, and any locking mechanism may be used as long as the locking mechanism may detachably lock the keyboard.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An electronic device, comprising:
a pair of frames in a bar shape, each of which standing spaced apart from each other;
an image display module having a display screen on the front thereof, which is supported on the pair of frames so as to slide up and down;
a keyboard module on which operational keys are arranged; and
a supporting member supported on the pair of frames, serving to support the keyboard module so as to rotate between a first state in which the keyboard is kept with operational keys lying upward and a second state in which the keyboard module is stood upright and stowed in the rear of the image display module that has been slid downward, around a rotation axis that passes through proximity of a rear edge of the keyboard module in the first state and that extends between the pair of frames, in a direction in which a front edge of the keyboard module in the first state is raised,
wherein the keyboard module is rotated between the second state and the first state by passing through a space defined with a lower edge of the image display module and the pair of frames, in a state where the image display module has been slid upward, and
wherein the image display module comprises a display panel having the display screen on the front and an up-and-down motion mechanism that moves the display panel up and down with respect to the pair of frames, and
the up-and-down motion mechanism comprises:
an extendable pole that extends and contracts in an up-and-down direction;
a first member that has a projection that slidably fits into a groove which extends in a longitudinal direction of the frame, and is fixed to one end of the extendable pole out of both upper and lower ends of the extendable pole as well as fixed to the display panel, where the projection slides relative to the groove so that the first member slides up and down relative to the frames; and a second member that is fixed to the other end of the extendable pole out of both upper and lower ends of the extendable pole as well as fixed to the frame by a bolt, and that contacts the display panel and slides up and down relative to the display panel.

2. The electronic device according to claim 1,
wherein the first state is a state in which both the keyboard module and the image display module are usable, and
the second state is a state where the keyboard module is unusable and only the image display module is usable, out of the keyboard module and the image display module.

3. The electronic device according to claim 1,
wherein the frame has a groove that extends in a longitudinal direction of the frame, and
the image display module has a projection that slidably fits into the groove.

4. The electronic device according to claim 1, wherein the keyboard module is formed of a keyboard stage that is rotatably supported on the supporting member and a keyboard that is detachably mounted on the keyboard stage that is rotated in the first state.

5. The electronic device according to claim 4, wherein the keyboard stage has a lock mechanism that detachably locks the keyboard mounted on the keyboard stage.

6. The electronic device according to claim 1, wherein the supporting member is formed of a pair of supporting pieces respectively supported on the pair of frames.

7. The electronic device according to claim 1, wherein the extendable pole is an up-and-down damper that supports the display panel in a flexible extended state.

* * * * *